US008984759B2

(12) United States Patent
Aoki et al.

(10) Patent No.: US 8,984,759 B2
(45) Date of Patent: Mar. 24, 2015

(54) BICYCLE CLEAT POSITIONING KIT AND BICYCLE CLEAT POSITIONING METHOD

(75) Inventors: Toshiaki Aoki, Osaka (JP); Junichi Kikuta, Osaka (JP)

(73) Assignee: Shimano Inc., Osaka (JP)

( * ) Notice: Subject to any disclaimer, the term of this patent is extended or adjusted under 35 U.S.C. 154(b) by 248 days.

(21) Appl. No.: 13/484,099

(22) Filed: May 30, 2012

(65) Prior Publication Data

US 2013/0318763 A1 Dec. 5, 2013

(51) Int. Cl.
A61B 5/103 (2006.01)

(52) U.S. Cl.
USPC ............................. 33/515; 33/3 C

(58) Field of Classification Search
CPC .......... B23Q 17/00; G01B 1/00; A61B 5/107; A61B 5/103; A43D 1/02; A43D 1/08; A43D 5/00; A43D 5/02; A43B 5/14; B62M 3/08
USPC ...... 33/515, 227, 228, 512, 3 R, 3 A, 3 B, 36, 33/613, 645; 29/407.01, 705; 12/123
See application file for complete search history.

(56) References Cited

U.S. PATENT DOCUMENTS

| | | | | |
|---|---|---|---|---|
| 290,652 A | * | 12/1883 | Sturmer | 164/15 |
| 770,065 A | * | 9/1904 | Smith et al. | 33/3 C |
| 838,720 A | * | 12/1906 | Kerr | 33/3 B |
| 1,067,987 A | * | 7/1913 | Kerr | 33/3 B |
| 1,139,227 A | * | 5/1915 | Reed | 33/3 A |
| 1,167,269 A | * | 1/1916 | Church | 33/3 A |
| 1,363,293 A | * | 12/1920 | Turner | 33/3 A |
| 1,525,064 A | * | 2/1925 | Brown | 33/3 A |
| 1,554,762 A | * | 9/1925 | Romiti | 33/3 B |
| 1,575,646 A | * | 3/1926 | Scholl | 33/3 R |
| 1,837,809 A | * | 12/1931 | Delhaye | 33/3 C |
| 2,507,032 A | * | 5/1950 | Mantos | 33/3 B |
| 2,518,798 A | * | 8/1950 | Legg, Jr. | 33/3 R |
| 2,657,463 A | * | 11/1953 | Spencer | 33/3 A |
| 2,782,504 A | * | 2/1957 | Del Pesco | 33/3 C |
| 4,635,366 A | * | 1/1987 | Fohrman et al. | 33/3 B |
| 5,115,692 A | * | 5/1992 | Nagano | 74/594.4 |
| 5,216,817 A | * | 6/1993 | Misevich et al. | 33/515 |
| 5,259,270 A | * | 11/1993 | Lin | 74/594.6 |
| 5,363,526 A | * | 11/1994 | Okajima | 12/133 B |

(Continued)

FOREIGN PATENT DOCUMENTS

DE 39 37 208 A1 5/1990
DE 93 00 261 U1 3/1993

(Continued)

OTHER PUBLICATIONS

Photograph of Mavic Ergo Cleat setting tool from http://joepapp.blogspot.com/2010/01/mavic-ergo-cleat-alignment-system-html—Published Jan. 30, 2010.

(Continued)

*Primary Examiner* — R. A. Smith
*Assistant Examiner* — Tania Courson
(74) *Attorney, Agent, or Firm* — Global IP Counselors

(57) ABSTRACT

A bicycle cleat positioning kit includes a foot locating instrument and a foot measuring instrument. The foot locating instrument includes a foot support surface. The foot measuring instrument includes a foot reference indicator indicative of a foot reference location and a cleat attachment indicator indicative of a cleat attachment location relative to the foot reference indicator.

31 Claims, 24 Drawing Sheets

(56) References Cited

U.S. PATENT DOCUMENTS

| | | | |
|---|---|---|---|
| 5,946,754 A * | 9/1999 | Baldini | 12/123 |
| 7,421,789 B1 * | 9/2008 | Sullivan | 33/3 R |
| 7,536,794 B2 * | 5/2009 | Hay et al. | 33/3 B |
| 7,571,544 B2 * | 8/2009 | Champoux et al. | 33/1 N |
| 7,685,728 B2 * | 3/2010 | Goonetilleke et al. | 33/515 |
| 8,567,081 B2 * | 10/2013 | Smith | 33/515 |
| 2010/0307030 A1 | 12/2010 | Tafaute et al. | |
| 2013/0318805 A1 * | 12/2013 | Aoki et al. | 33/515 |
| 2013/0333124 A1 * | 12/2013 | Okamoto et al. | 12/123 |

FOREIGN PATENT DOCUMENTS

| | | | | |
|---|---|---|---|---|
| FR | 2 940 020 A1 | 6/2010 | | |
| WO | WO-2005/025974 A1 | 3/2005 | | |
| WO | WO 2005025974 A1 * | 3/2005 | | B62M 3/08 |

OTHER PUBLICATIONS

Ergon Bike Ergonomics; Check you cleats; from http://www.ergon-bike.com/us/en/blog/; Feb. 2012; Ergon USA.

German Search Report of corresponding German patent Application No. 10 2013 111 882.8 dated Sep. 22, 2014.

* cited by examiner

30L

| E | FOOT OPEN ANGLE | 6 | TEMPLATE |
|---|---|---|---|
| F | SHOES ANGLE | 2/1 | SPD-SL 2 DEG<br>SPD 1 DEG |
| G | FOOT-SHOES ANGLE | 1 | TEMPLATE |
| H | SHOES-CLEAT ANGLE | 3 | E-F-G |
| I | F/R CLEAT POSITION | -9 | TEMPLATE |
| J | IN/OUT CLEAT POSITION | 6 | TEMPLATE |
| K | PEDLING ANGLE | | THIS SHEET |
| L | PEDLING ADJUST | | THIS SHEET |
| M | F/R ADJUSTED POSITION | | I+L |
| N | CRANK ATTACH ADJUST | | THIS SHEET |
| O | ADJUSTED IN/OUT POSITION | 0 OR -4mm IN | 0 : NORMAL AXLE<br>-4 :4MM LONG AXLE |
| P | NORMAL/LONG AXLE | | J+N+O |

| H | N |
|---|---|
| DEG | mm |
| 1 | 0 |
| 2 | 0 |
| 3 | 1.6 in |
| 4 | 3.9 in |
| 5 | 6.2 in |

| | | | |
|---|---|---|---|
| E | FOOT OPEN ANGLE | 6 | TEMPLATE |
| F | SHOES ANGLE | 2/1 | SPD-SL 2 DEG<br>SPD 1 DEG |
| G | FOOT-SHOES ANGLE | 1 | TEMPLATE |
| H | SHOES-CLEAT ANGLE | 3 | E-F-G |
| I | F/R CLEAT POSITION | -9 | TEMPLATE |
| J | IN/OUT CLEAT POSITION | 6 | TEMPLATE |
| K | PEDLING ANGLE | +10 | THIS SHEET |
| L | PEDLING ADJUST | -0.7 | THIS SHEET |
| M | F/R ADJUSTED POSITION | -9.7 | I+L |
| N | CRANK ATTACH ADJUST | 1.6 | THIS SHEET |
| O | ADJUSTED IN/OUT POSITION | 0 OR -4mm IN | 0 : NORMAL AXLE<br>-4 :4MM LONG AXLE |
| P | NORMAL/LONG AXLE | 3.6 | J+N+O |

BICYCLE CLEAT POSITIONING KIT AND BICYCLE CLEAT POSITIONING METHOD

BACKGROUND

1. Field of the Invention

This invention generally relates to a bicycle cleat positioning kit. More specifically, the present invention relates to a bicycle cleat positioning kit which includes a foot measuring instrument. Furthermore, the present invention relates to a bicycle cleat positioning method.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

Pedals are an essential bicycle component in that they transfer cycling power to the bicycle's drive train. Different styles of bicycles utilize different bicycle pedal styles that are designed for a specific purpose such as for pleasure, off road biking, road racing, etc. In recent years, step-in or clipless pedals have gained more popularity. The step-in or clipless pedal releasably engages a cleat secured to the sole of a rider's bicycle shoe. In other words, the cleats are attached to the soles of bicycle shoes. The cleats lock the rider's feet into pedals of bicycle. More specifically, the cleats lock the rider's feet position and the rider's feet angle with respect to the pedals of the bicycle.

SUMMARY

For the sake of rider's comfort and cycling performance while riding the bicycle, the cleats need to be properly adjusted with respect to the soles of the bicycle shoes. In particular, it has been discovered that, for efficiently transferring cycling power to the pedals, the cleats need to be adequately positioned with respect to the rider's feet.

One object of the present disclosure is to provide a bicycle cleat positioning kit with which a cleat can be properly adjusted with respect to a rider's foot.

In accordance with one aspect of the present disclosure, a bicycle cleat positioning kit includes a foot locating instrument and a foot measuring instrument. The foot locating instrument includes a foot support surface. The foot measuring instrument includes a foot reference indicator indicative of a foot reference location and a cleat attachment indicator indicative of a cleat attachment location relative to the foot reference indicator.

These and other objects, features, aspects and advantages will become apparent to those skilled in the art from the following detailed description, which, taken in conjunction with the annexed drawings, discloses selected embodiments.

BRIEF DESCRIPTION OF THE DRAWINGS

Referring now to the attached drawings which form a part of this original disclosure:

FIG. 15 is an enlarged view of a left parameter table on the foot locating instrument illustrated in FIG. 2, illustrating parameter values measured by the foot measuring instrument recorded on the left parameter table;

FIG. 17 is enlarged views of a second parameter chart of adjustment values corresponding to shoes-cleat angles, and the left parameter table on the foot locating instrument illustrated in FIG. 2, illustrating a parameter value calculated based on the second parameter chart recorded on the left parameter table;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
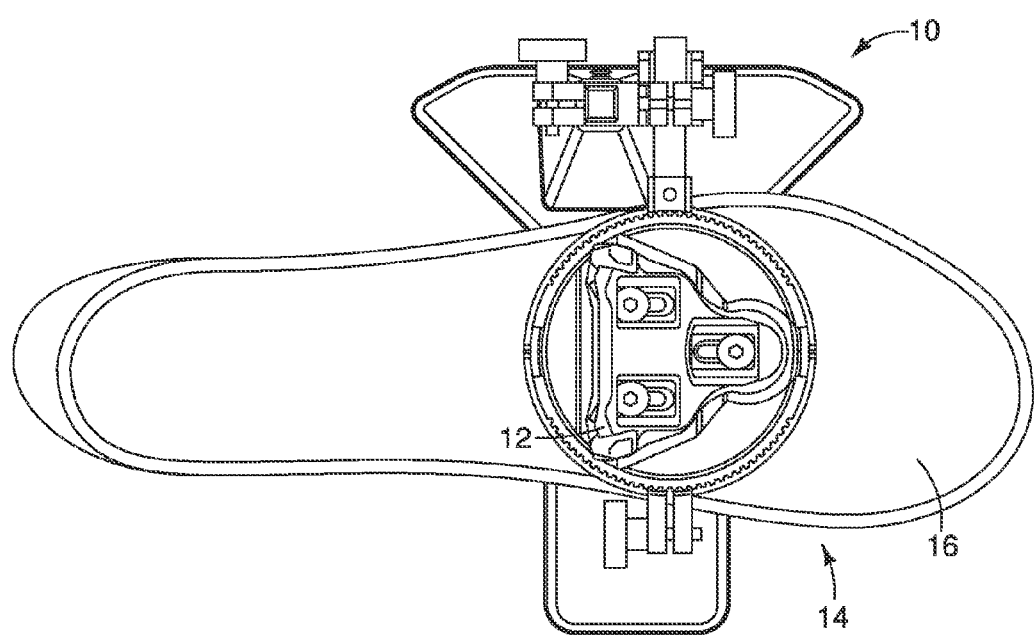
FIG. 1 is a top plan view of a cleat setting device for adjusting a cleat with respect to a shoe sole of a bicycle shoe with the cleat setting device utilized with a bicycle cleat positioning kit in accordance with a first embodiment.
Figure 2:
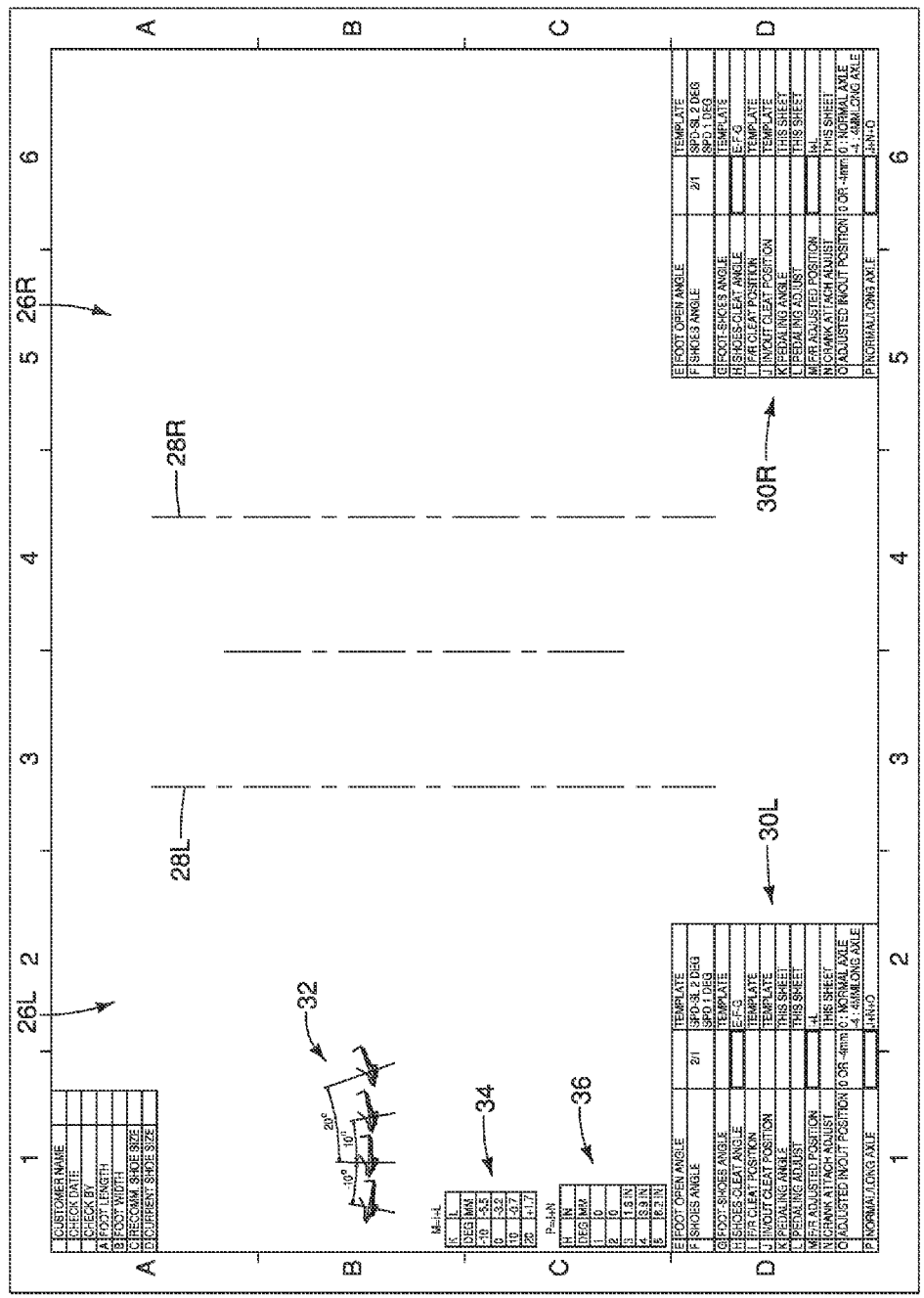
FIG. 2 is a top plan view of a foot locating instrument of the bicycle cleat positioning kit.
Figure 3:
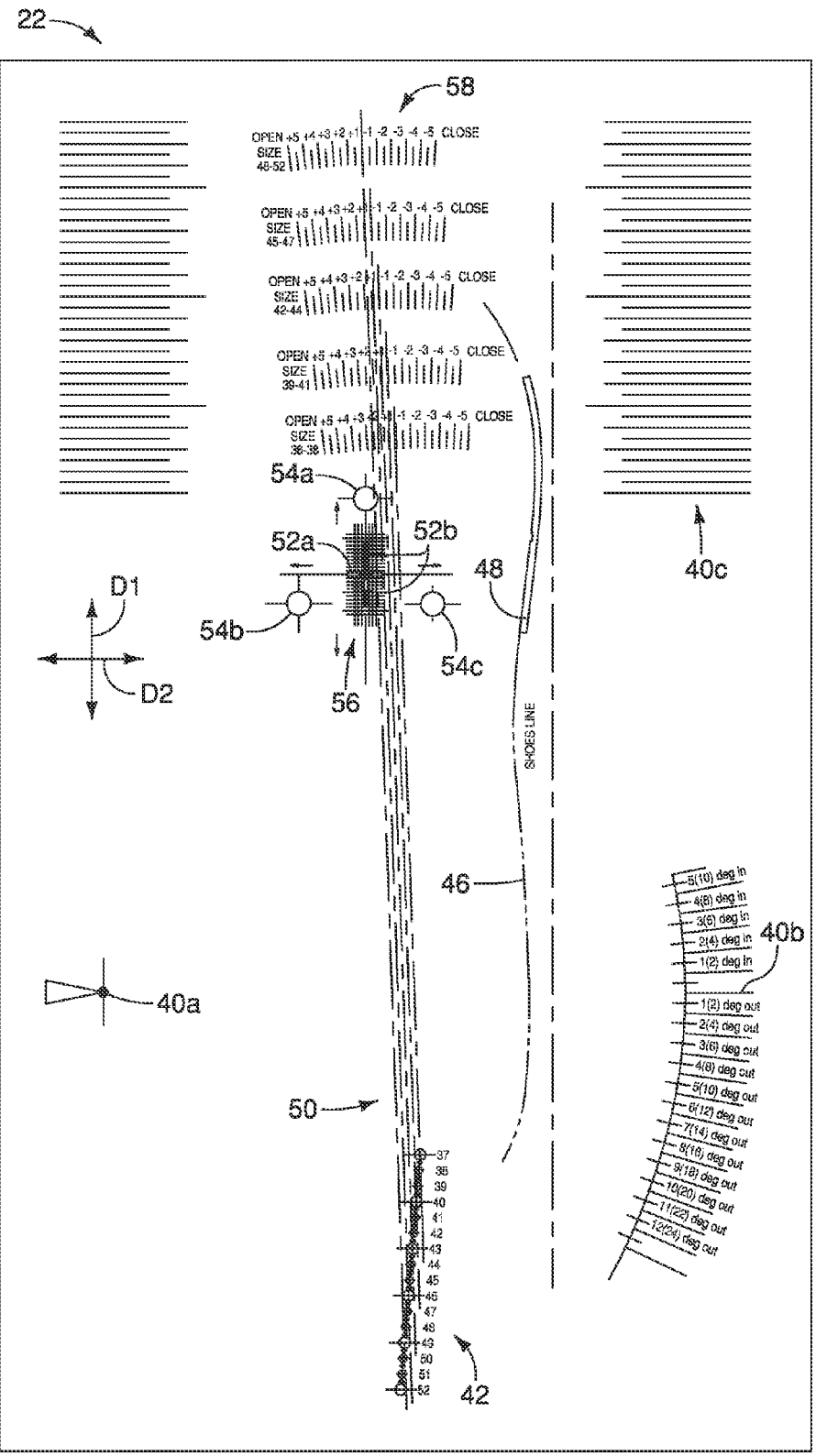
FIG. 3 is a top plan view of a foot measuring instrument of the bicycle cleat positioning kit.

As illustrated in FIG. 1, a cleat setting device 10 is utilized for adjusting a cleat 12 with respect to a bicycle shoe 14 with a bicycle cleat positioning kit in accordance with a first embodiment. The cleat setting device 10 adjusts lengthwise and widthwise locations of the cleat 12 and an orientation of the cleat 12 on a shoe sole 16 of the bicycle shoe 14. The cleat setting device 10 adjusts the cleat 12 with respect to the bicycle shoe 14 based on a plurality of parameter values obtained by the bicycle cleat positioning kit. As illustrated in FIGS. 2 and 3, the bicycle cleat positioning kit basically includes a foot locating instrument 20 and a foot measuring instrument 22. The foot locating instrument 20 and the foot measuring instrument 22 provide the parameter values for the cleat setting device 10 through a bicycle cleat positioning method in accordance with the first embodiment. This bicycle cleat positioning method in accordance with the first embodiment will be described in detail through reference to FIGS. 7 to 18 below.

Figure 4:
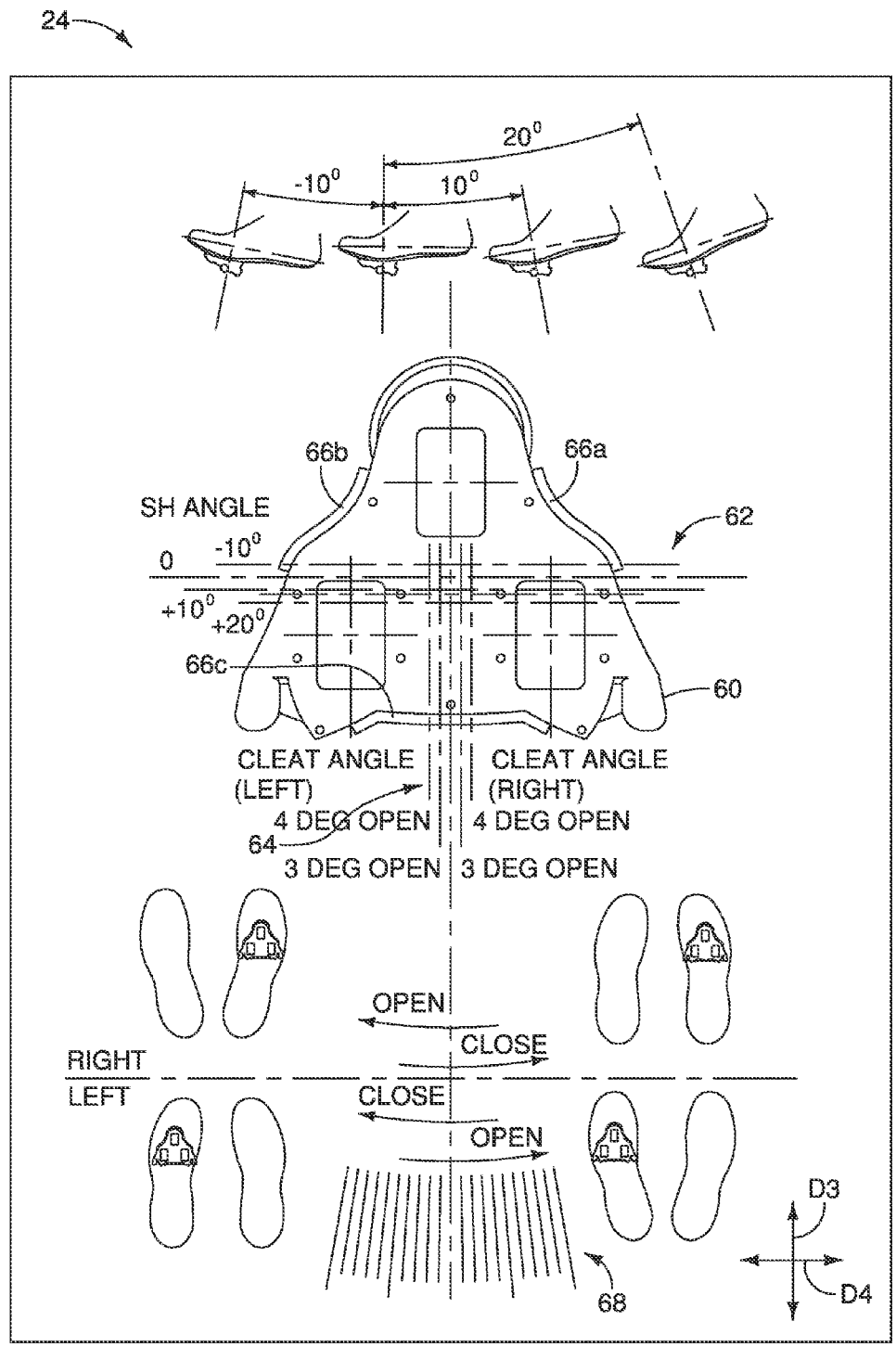
FIG. 4 is a top plan view of a cleat adjusting instrument of the bicycle cleat positioning kit.

Additionally or optionally, as illustrated in FIG. 4, the bicycle cleat positioning kit includes a cleat adjusting instrument 24. The cleat adjusting instrument 24 is utilized for adjusting the cleat 12 with respect to the shoe sole 16 of the bicycle shoe 14 without utilizing the cleat setting device 10. The cleat adjusting instrument 24 determines the lengthwise and widthwise locations of the cleat 12 and the orientation of the cleat 12 on the shoe sole 16 of the bicycle shoe 14 based on the parameter values obtained by the foot locating instrument 20 and the foot measuring instrument 22 through a bicycle cleat positioning method in accordance with a second embodiment. This bicycle cleat positioning method in accordance with the second embodiment will be described in detail through reference to FIGS. 7 to 15 and 19 to 26 below.

Figure 5:
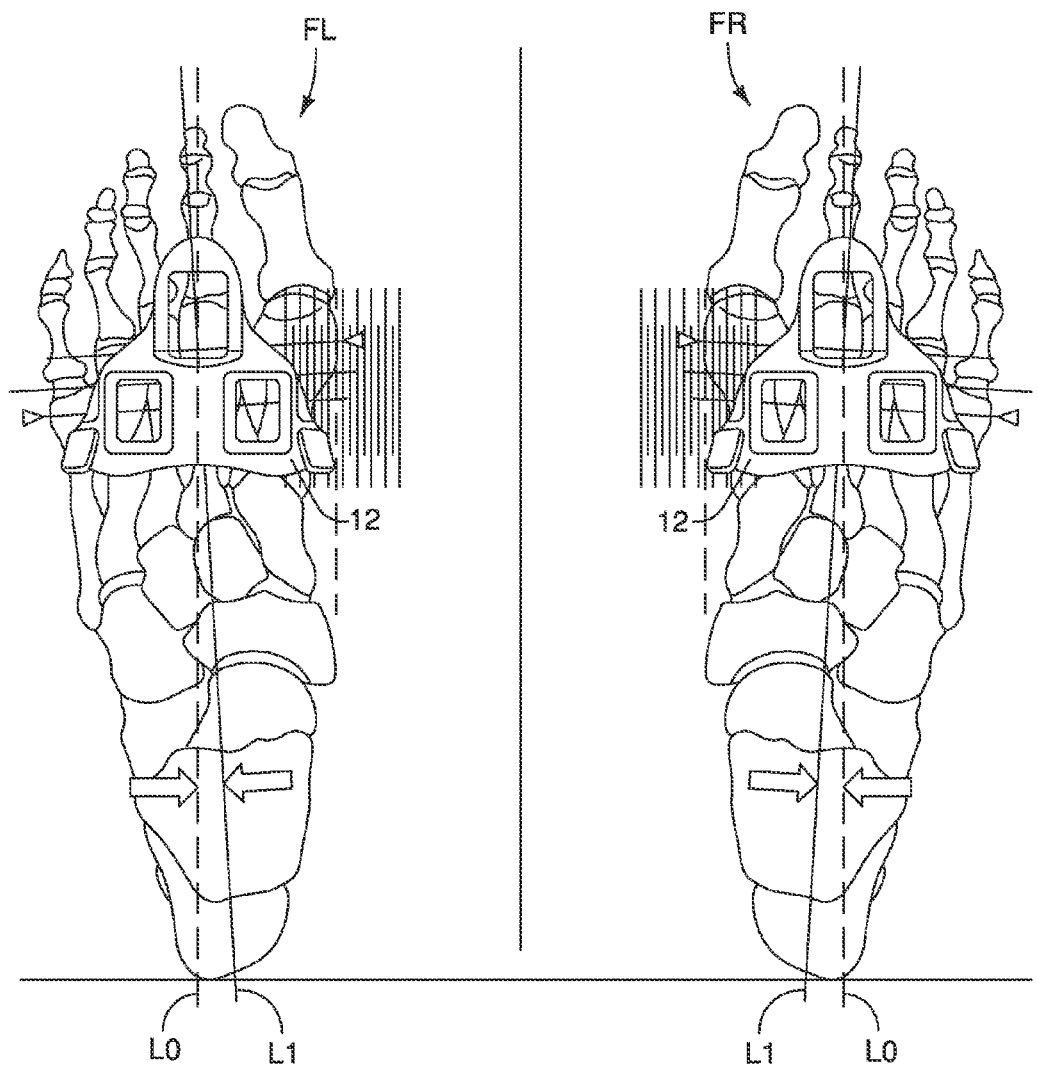
FIG. 5 is a schematic view of a skeletal structure of person's feet illustrating a relationship between the person's feet and the cleats.
Figure 6:
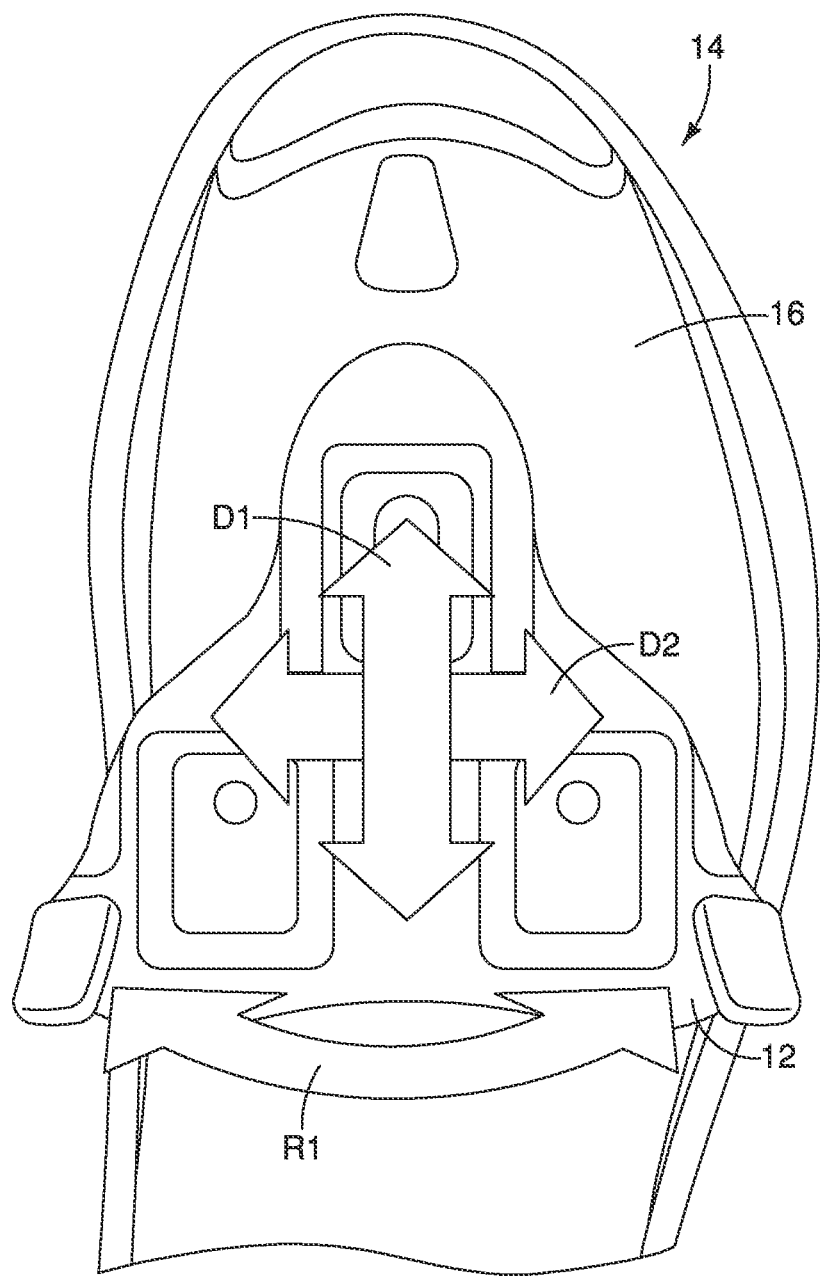
FIG. 6 is a partial bottom plan view of the bicycle shoe with the cleat, illustrating an adjustment of the cleat with respect to the bicycle shoe.

As illustrated in FIGS. 5 and 6, with the bicycle cleat positioning kit and the bicycle cleat positioning method in accordance with the first and second embodiments, the cleats 12 are aligned to the centers of left and right feet FL and FR, respectively, by adjusting the cleats 12 with respect to the shoe soles 16 of the bicycle shoes 14 in lengthwise and widthwise directions D1 and D2. Thus, pedaling power from the person's feet FL and FR can be effectively transferred to the pedal through the bicycle shoes 14 with the cleats 12. Furthermore, the cleats 12 are adjusted in a rotational direction R1 such that center axes L1 of the person's feet FL and FR are oriented to form proper foot opening angles with respect to reference axes L0 of the bicycle. Thus, the cleats 12 can lock the person's feet FL and FR in comfortable postures while riding the bicycle.

Referring now to FIGS. 2 to 4, the bicycle cleat positioning kit will be further described in detail. As illustrated in FIG. 2, the foot locating instrument 20 basically includes a printed sheet member with a foot support surface. The foot support surface of the foot locating instrument 20 basically has left and right foot support portions 26L and 26R. The foot support surface of the foot locating instrument 20 also has left and right crank arm reference indicators 28L and 28R. Furthermore, the foot locating instrument 20 includes left and right parameter tables 30L and 30R, a graphic diagram 32 indicative of pedaling angles, and first and second parameter charts 34 and 36. The left and right foot support portions 26L and 26R, the left and right crank arm reference indicators 28L and 28R, the left and right parameter tables 30L and 30R, the graphic diagram 32, and the first and second parameter charts 34 and 36 are disposed on or printed on the sheet member of the foot locating instrument 20.

The left and right foot support portions 26L and 26R are the areas on which a person (e.g., wearer of the bicycle shoes 14 or rider of the bicycle) places his or her feet FL and FR (see FIG. 5), respectively, while tracing foot outlines L10 (see FIG. 8) of the person's feet FL and FR on the foot support surface of the foot locating instrument 20. The left and right crank arm reference indicators 28L and 28R include parallel lines extending in a direction representing a longitudinal direction (e.g., front to rear direction) of the bicycle. The left and right crank arm reference indicators 28L and 28R are spaced apart from each other by a distance corresponding to a widthwise dimension between crank rotation surfaces of crank arms of the bicycle. The left and right foot support portions 26L and 26R are located outside of a center area between the left and right crank arm reference indicators 28L and 28R with respect to the left and right crank arm reference indicators 28L and 28R, respectively.

The left and right parameter tables 30L and 30R includes a plurality of parameter items. Each of the parameter items includes a parameter names, a parameter value and a remark. The parameter names of the parameter items include "FOOT OPEN ANGLE," "SHOES ANGLE," "FOOT-SHOES ANGLE," "SHOES-CLEAT ANGLE," "F/R CLEAT POSITION," "IN/OUT CLEAT POSITION," "PEDALING ANGLE," "PEDALING ADJUST," "F/R ADJUSTED POSITION," "CRANK ATTACH ADJUST," "ADJUSTED IN/OUT POSITION" and "NOMAL/LONG AXLE" The parameter values are recorded on the left and right parameter tables 30L and 30R after the parameter values are measured by the foot measuring instrument 22 or calculated based on indication of the remarks. The remarks indicate how the parameter values are obtained. Specifically, the remarks indicate that the parameter values are obtained from either a "TEMPLATE," which indicates the foot measuring instrument 22, or a "THIS SHEET," which indicates the foot locating instrument 20. The remarks further indicate alternatives from which the parameter values are chosen, respectively, and formulas by which the parameter values are calculated. The graphic diagram 32 indicates the pedaling angles ("PEDALING ANGLE") corresponding to different foot postures while pedaling, respectively. The first parameter chart 34 provides adjustment values (e.g., "PEDALING ADJUST") related to the pedaling angles. The second parameter chart 36 provides adjustment values (e.g., "CRANK ATTACH ADJUST") related to different parameter values of "SHOES-CLEAT ANGLE."

As illustrated in FIG. 3, the foot measuring instrument 22 basically includes an alignment point 40a, a foot opening angle scale 40b and a plurality of alignment lines 40c. The foot measuring instrument 22 also includes a plurality of heel alignment points 42, a shoe reference outline 46 with an alignment section 48. The foot measuring instrument 22 also includes a plurality of shoe reference lines 50. Furthermore, the foot measuring instrument 22 includes a plurality of reference slits 52a and 52b, and a plurality of reference apertures 54a, 54b and 54c. Moreover, the foot measuring instrument 22 includes a positional displacement indicator 56 and an angular displacement indicator 58. The foot measuring instrument 22 includes a transparent sheet member. The alignment point 40a, the foot opening angle scale 40b, the alignment lines 40c, the heel alignment points 42, the shoe reference outline 46, the shoe reference lines 50, the positional displacement indicator 56 and the angular displacement indicator 58 are disposed on or printed on a surface of the transparent sheet member of the foot measuring instrument 22. The reference slits 52a and 52b and the reference apertures 54a, 54b and 54c are formed through the transparent sheet member of the foot measuring instrument 22. The transparent sheet member is made of plastic or other resin material. The foot measuring instrument 22 can alternatively be made of a translucent sheet member. Further, the number of the reference apertures can vary depending of a type of the bicycle shoe 14.

The alignment point 40a, the foot opening angle scale 40b and the alignment lines 40c form an angular displacement indicator for measuring an angular displacement between center lines L11 (see FIG. 8) of the foot outlines L10 traced on the foot locating instrument 20. Specifically, the alignment point 40a, the foot opening angle scale 40b and the alignment lines 40c are arranged with respect to each other such that the foot opening angle scale 40b indicates an angular displacement between the center lines L11 when the alignment point 40a is arranged on one center line L11 and the alignment lines 40c are arranged parallel to the other center line L11. The heel alignment points 42 and the shoe reference outline 46 form a foot reference indicator indicative of a foot reference location with respect to the foot measuring instrument 22. The heel alignment points 42 are provided corresponding to different foot sizes, respectively. Specifically, the heel alignment points 42 represent different heel center positions of feet with different foot sizes, respectively. The shoe reference lines 50 form a shoe reference indicator indicative of a bicycle shoe orientation with respect to the shoe reference outline 46. In particular, the shoe reference lines 50 are provided corresponding to different foot sizes, respectively, and pass through the corresponding heel alignment points 42, respectively. The shoe reference lines 50 represent reference orientations of the bicycle shoes with different foot sizes. The reference slits 52a and 52b, and the reference apertures 54a, 54b and 54c form a cleat attachment indicator indicative of a cleat attachment location relative to the shoe reference outline 46 and the heel alignment points 42. The cleat attachment location indicates a reference location for setting the cleat 12 with respect to the bicycle shoe 14 with the cleat setting device 10. In particular, the reference slits 52a and 52b represent a reference point P15 (e.g., center point) (see FIG. 13) for adjusting the cleat 12 with respect to the bicycle shoe 14. Furthermore, the reference apertures 54a, 54b and 54c represent positions of cleat attachment holes for attaching the cleat 12 to the bicycle shoe 14. The positional displacement indicator 56 is arranged to measure a positional displacement of a center point P10 (see FIG. 8) of each of the foot outlines L10 on the foot locating instrument 20 with respect to the reference point P15 represented by the reference slits 52a and 52b. The angular displacement indicator 58 includes a plurality of angular scales. Each of the angular scales of the angular displacement indicator 58 is arranged to measure an angular displacement of the center line L11 of each of the foot outlines L10 on the foot locating instrument 20 with respect to a corresponding one of the shoe reference lines 50. Specifically, the angular scales are provided corresponding to different foot size intervals and corresponding to the shoe reference lines 50 such that each of the angular scales measures an angle between the center line L11 of each of the foot outlines L10 and the corresponding one of the shoe reference lines 50 about the corresponding one of the heal alignment points 42.

The foot measuring instrument 22 illustrated in FIG. 3 is basically utilized for the left foot FL. However, the foot measuring instrument 22 can also be utilized for the right foot FR by turning over the foot measuring instrument 22. Since the foot measuring instrument 22 is transparent, the alignment point 40a, the foot opening angle scale 40b, the alignment lines 40c, the heel alignment points 42, the shoe reference outline 46, the shoe reference lines 50, the positional displacement indicator 56 and the angular displacement indicator 58 are visible from both sides of the foot measuring instrument 22. On the other hand, the bicycle cleat positioning kit can also include an additional foot measuring instrument utilized for the right foot FR. In this case, this additional foot measuring instrument has a mirror symmetric arrangement of the foot measuring instrument 22, except for texts on the foot measuring instrument 22.

As illustrated in FIG. 4, the cleat adjusting instrument 24 basically includes a cleat reference indicator 60, a plurality of lengthwise position alignment indicators 62 (e.g., first indicators), a plurality of widthwise position alignment indicators 64 (e.g., second indicators), a plurality of positioning slits 66a, 66b and 66c (e.g., apertures), and a cleat orientation alignment indicator 68. The cleat adjusting instrument 24 includes a transparent sheet member. The cleat reference indicator 60, the lengthwise position alignment indicators 62, the widthwise position alignment indicators 64 and the cleat orientation alignment indicator 68 are disposed on or printed on a surface of the transparent sheet member of the cleat adjusting instrument 24. The positioning slits 66a, 66b and 66c are formed through the transparent sheet member of the cleat adjusting instrument 24. The transparent sheet member is made of plastic or other resin material. The cleat adjusting instrument 24 can alternatively include a translucent sheet member. The cleat adjusting instrument 24 illustrated in FIG. 4 is basically utilized for the left and right feet FL and FR.

The cleat reference indicator 60 indicates a cleat outline. The lengthwise position alignment indicators 62 and the widthwise position alignment indicator 64 form a cleat position alignment indicator indicative of different positions of the center point P10 (see FIG. 8) of each of the foot outlines L10 on the foot locating instrument 20 with respect to the cleat reference indicator 60. The lengthwise position alignment indicators 62 represent lengthwise positions (e.g., first foot center locations) of the center point P10 of each of the foot outlines L10 with respect to the cleat reference indicator 60 in a lengthwise direction D3 (e.g., first direction) of the cleat reference indicator 60, respectively. The lengthwise position alignment indicators 62 are provided corresponding to different pedaling angles. The widthwise position alignment indicators 64 represent widthwise positions (e.g., second foot center locations) of the center point P10 of each of the foot outlines L10 with respect to the cleat reference indicator 60 in a widthwise direction D4 (e.g., second direction) of the cleat reference indicator 60, respectively. The widthwise direction D4 is perpendicular to the lengthwise direction D3. The widthwise position alignment indicators 64 are provided corresponding to different cleat angles (e.g., bicycle cleat orientations) with respect to the bicycle shoe 14. The lengthwise and widthwise directions D3 and D4 are perpendicular to each other. The positioning slits 66a, 66b and 66c extend along an outer peripheral of the cleat reference indicator 60. The cleat orientation alignment indicator 68 indicates an orientation of the cleat reference indicator 60 with respect to each of the center lines L11 of the foot outlines L10.

Referring now to FIGS. 7 to 18, the bicycle cleat positioning method in accordance with the first embodiment will now be described in detail. The foot locating instrument 20 (see FIG. 2) and the foot measuring instrument 22 (see FIG. 3) provide the parameter values for the cleat setting device 10 (see FIG. 1) through this bicycle cleat positioning method.

Figure 7:
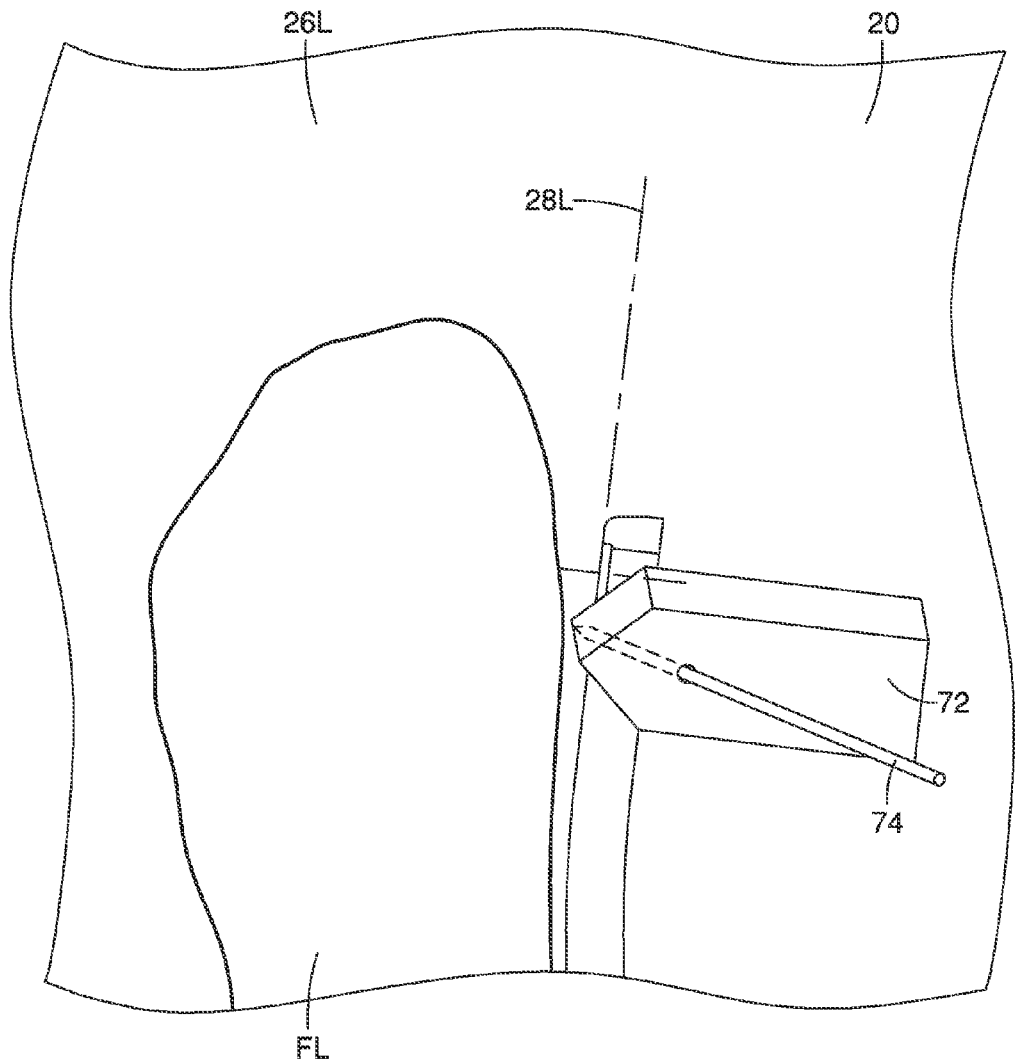
FIG. 7 is an enlarged view of the foot locating instrument illustrated in FIG. 2, illustrating a tracing of an outline of the person's foot on the foot locating instrument.
Figure 8:
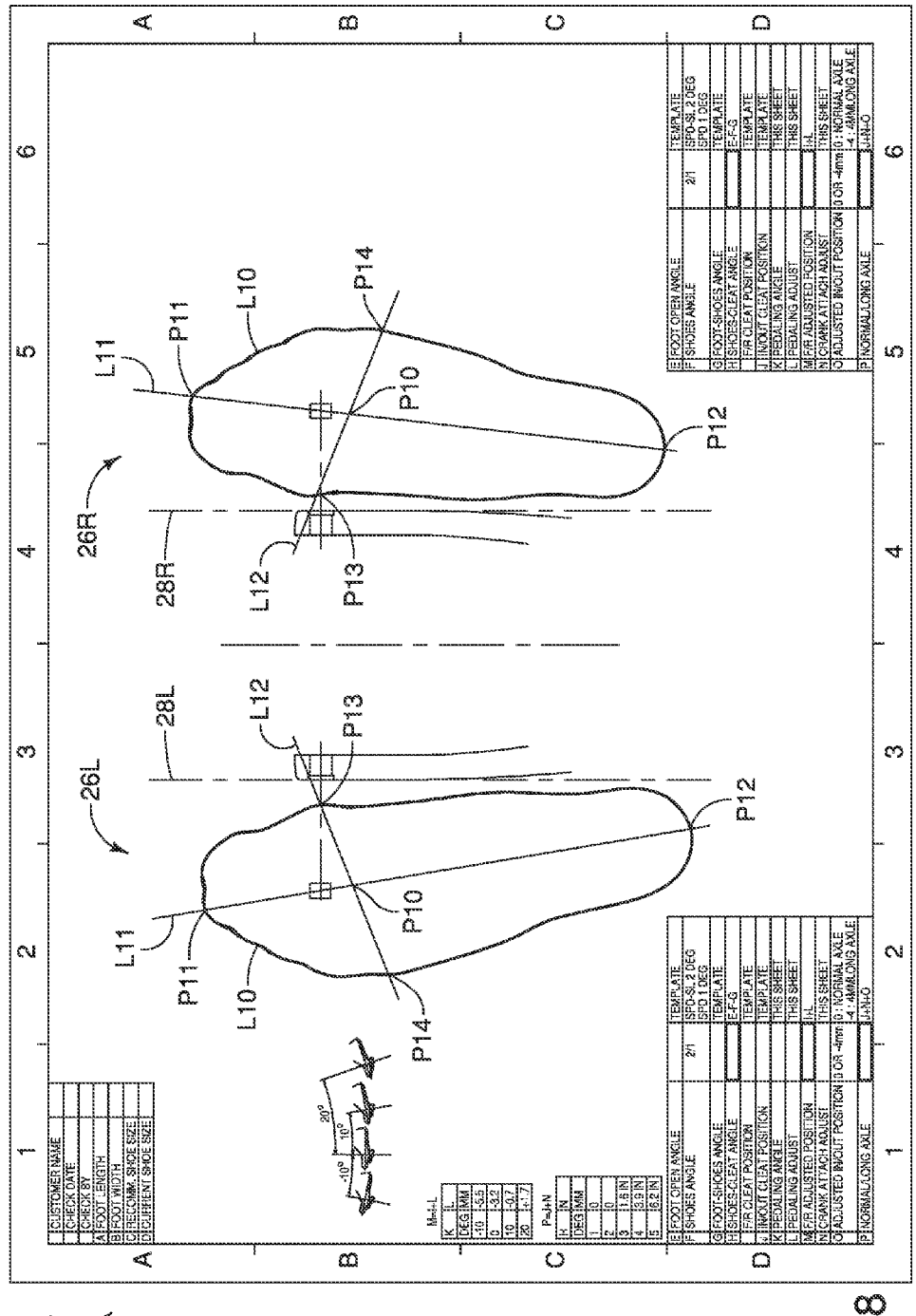
FIG. 8 is a top plan view of the foot locating instrument illustrated in FIG. 2, illustrating foot outlines of the person's feet traced on the foot locating instrument.

As illustrated in FIGS. 7 and 8, the bicycle cleat positioning method basically includes manually tracing outlines of the person's feet FL and FR on the foot locating instrument 20. In particular, as illustrated in FIG. 7, the person places his or her feet FL and FR on the foot locating instrument 20 at the left and right foot support portions 26L and 26R outside the left and right crank arm reference indicators 28L and 28R, respectively. Specifically, the person places his or her feet FL and FR on the foot locating instrument 20 such that the feet FL and FR is arranged in his or her neutral or comfortable position for riding the bicycle. For better understanding of this procedure, FIG. 7 only illustrates that the left foot FL is placed on the foot locating instrument 20 at the left foot support portion 26L outside the left crank arm reference indicator 28L. The outlines of the person's feet FL and FR are traced with a tracing device 72 having a writing instrument 74, such as a ballpoint pen and the like. In particular, the tracing device 72 is slid around the person's feet FL and FR on the foot locating instrument 20 along the outlines of the person's feet FL and FR, by which the writing instrument 74 marks the left and right foot support portion 26L and 26R with the foot outlines L10, as illustrated in FIG. 8.

Furthermore, as illustrated in FIG. 8, the bicycle cleat positioning method includes marking the foot locating instrument 20 with the center points P10 of the foot outlines L10 of the person's feet FL and FR and the center lines L11 (e.g., center axes) of the foot outlines L10 of the person's feet FL and FR. In particular, after tracing the foot outlines L10 on the foot locating instrument 20, a toe center position P11, a heel center position P12, a thenar apex position P13 and a antithenar apex position P14 are determined on each of the foot outlines L10. The toe center position P11 is determined as an apex position of a convex segment of each of the foot outlines L10 that represents the second finger of each of the person's feet FL and FR. The heel center position P12 is determined as an apex position of a convex segment of each of the foot outlines L10 that represents the heel of each of the person's feet FL and FR. The thenar apex position P13 is determined as an apex position of a convex segment of each of the foot outlines L10 that represents a ball of the thumb of each of the person's feet FL and FR. The antithenar apex position P14 is determined as an apex position of a convex segment of each of the foot outlines L10 that represents a ball of the fifth finger of each of the person's feet FL and FR. Then, the center lines L11 of the foot outlines L10 are drawn on the foot locating instrument 20 such that the center lines L11 pass through the toe center positions P11 and the heel center positions P12, respectively. Furthermore, transverse lines L12 of the foot outlines L10 are drawn on the foot locating instrument 20 such that the transverse lines L12 pass through the thenar apex positions P13 and the antithenar apex positions P14, respectively. Moreover, intersections of the center lines L11 and the transverse lines L12 inside the foot outlines are determined as the center points P10 of the foot outlines L10. Here, as illustrated FIGS. 7 and 8, the foot locating instrument 20 additionally or optionally includes graphic indicators indicative of crank arms and pedal axes as a reference for easy positioning the person's feet FL and FR on the left and right foot support portions 26L and 26R. However, the foot locating instrument 20 does not necessarily include the graphic indictors as illustrated FIG. 2.

Figure 9:
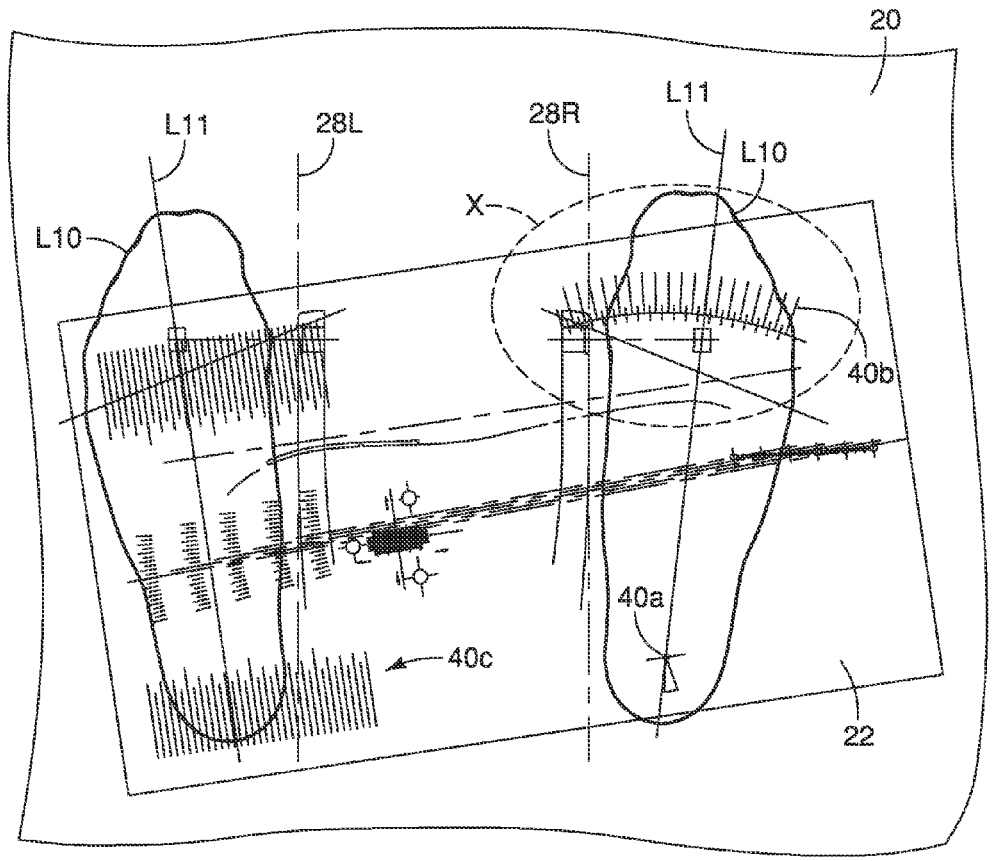
FIG. 9 is a top plan view of the foot locating instrument illustrated in FIG. 2 and the foot measuring instrument illustrated in FIG. 3, illustrating the foot measuring instrument overlaid on the foot locating instrument to measure an angle between center lines of the foot outlines of the person's feet on the foot locating instrument.
Figure 10:
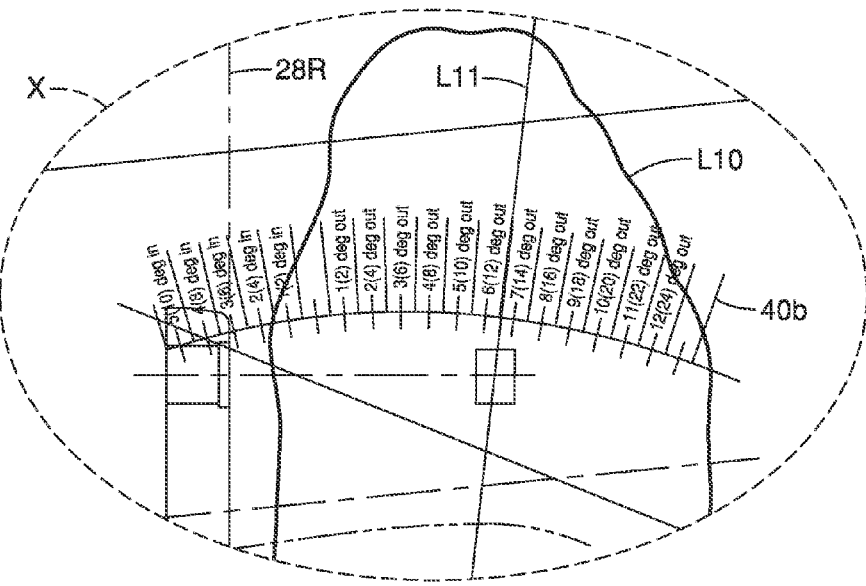
FIG. 10 is an enlarged view of an encircled portion X in FIG. 9, illustrating the angle between the center lines of the foot outlines of the person's feet on the foot locating instrument measured by the foot measuring instrument.

As illustrated in FIGS. 9 and 10, the bicycle cleat positioning method further includes overlying the foot measuring instrument 22 on the foot locating instrument 20, and measuring the foot opening angles (e.g., "FOOT OPEN ANGLE" in FIG. 2) of the center lines L11 of the foot outlines L10 on the foot locating instrument 20 with respect to the left and right crank arm reference indicators 28L and 28R. Specifically, the foot measuring instrument 22 is overlaid on the foot locating instrument 20, and aligned with respect to the foot locating instrument 20 such that the alignment point 40a is arranged on the center line L11 of the foot outline L10 of the person's right foot FR, and such that the alignment lines 40c are arranged parallel to the center line L11 of the person's left foot FL. With this alignment, as illustrated in FIG. 10, the foot opening angle scale 40b indicates the foot opening angles of the center lines L11 of the foot outlines L10 on the foot locating instrument 20 with respect to the left and right crank arm reference indicators 28L and 28R as a half of an angle formed between the center lines L11. For example, FIG. 10 illustrates that the foot opening angle scale 40b indicates "6(12) deg out," which means that the angle between the center lines L11 is "12 degrees", the foot opening angles of the center lines L11 with respect to the left and right crank arm reference indicators 28L and 28R are "6 degrees," and that the foot outlines L10 of the person's feet FL and FR are arranged in an open stance. Then, the foot opening angles of the person's feet FL and FR are written down in the left and right parameter tables 30L and 30R as parameter values of the "FOOT OPEN ANGLE." Here, the foot opening angles are obtained as a half of the angle between the center lines L11. However, the foot opening angles can also be obtained by measuring angles between the center lines L11 and the left and right crank arm reference indicators 28L and 28R, respectively. Furthermore, with the foot opening angle scale 40b, a rotational direction that makes the stance more open is defined as a positive direction.

Figure 11:
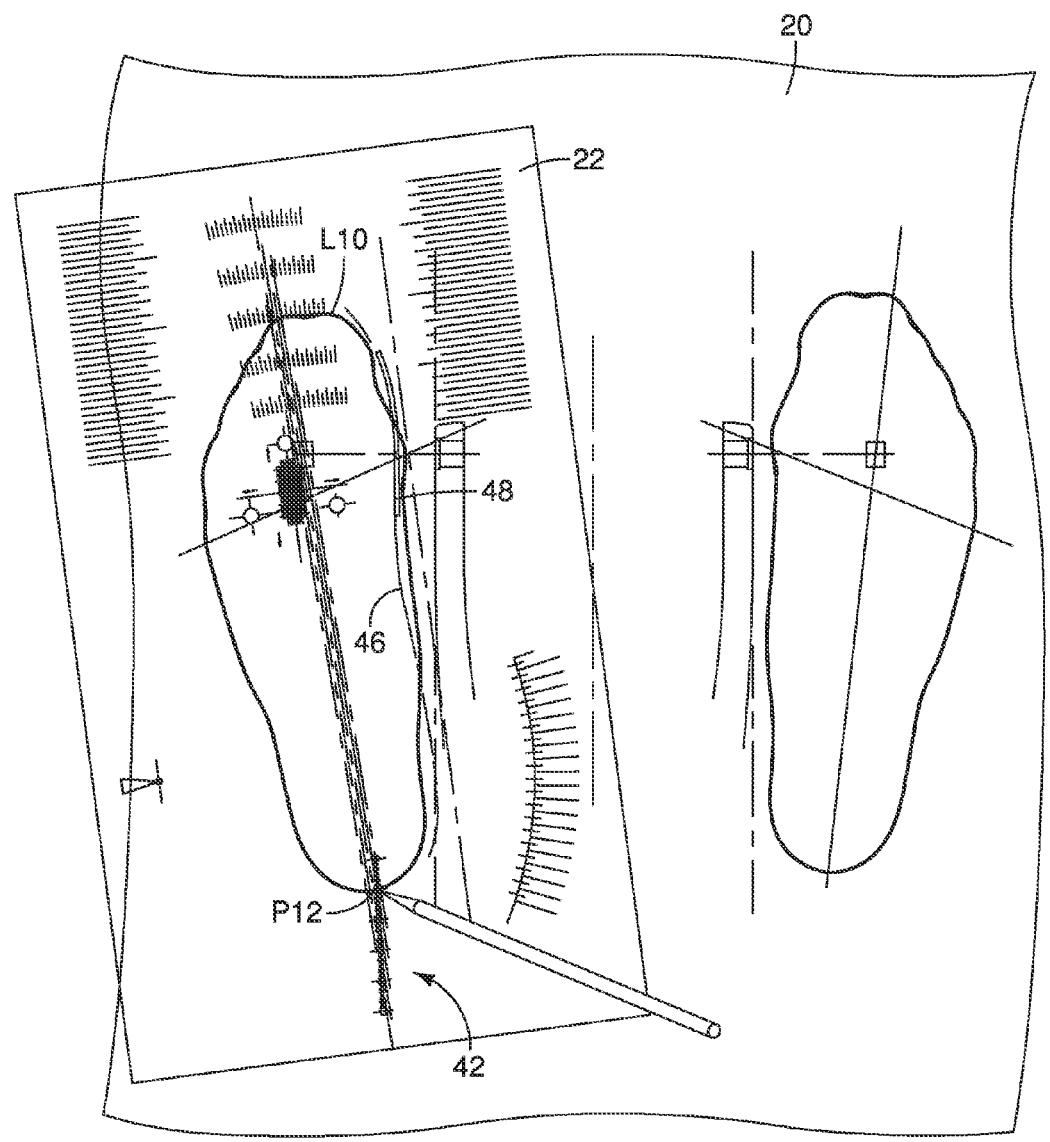
FIG. 11 is a top plan view of the foot locating instrument illustrated in FIG. 2 and the foot measuring instrument illustrated in FIG. 3, illustrating the foot measuring instrument overlaid on the foot locating instrument such that a heel center position of the foot outline of the person's foot on the foot locating instrument is aligned to a heel alignment point on the foot measuring instrument.
Figure 12:
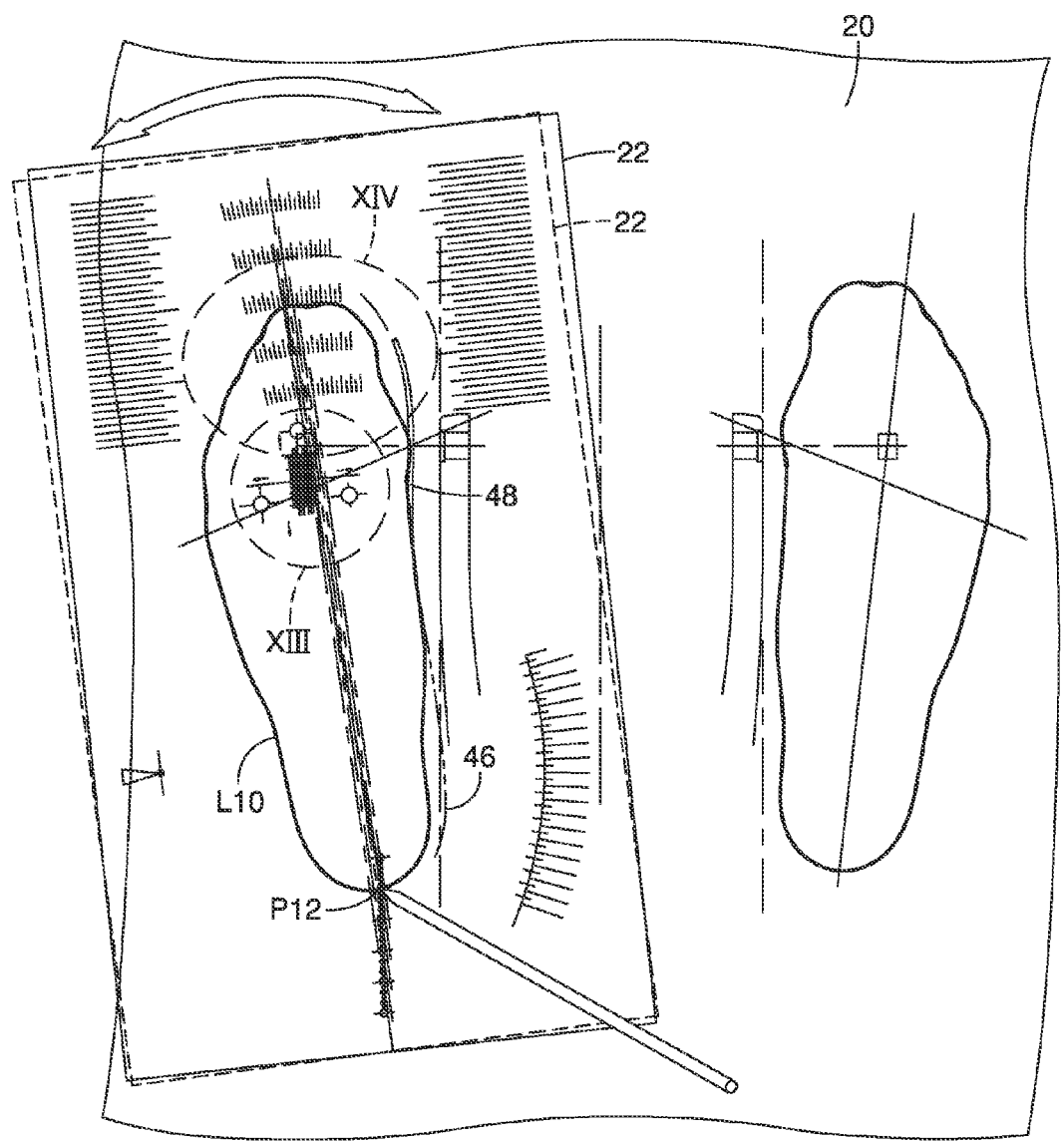
FIG. 12 is a top plan view of the foot locating instrument illustrated in FIG. 2 and the foot measuring instrument illustrated in FIG. 3, illustrating the foot measuring instrument rotated around the heel alignment point on the foot measuring instrument with respect to the foot locating instrument such that an alignment section of a shoe reference outline on the foot measuring instrument is aligned to a part of the foot outline of the person's foot on the foot locating instrument.

As illustrated in FIGS. 11 and 12, the bicycle cleat positioning method further includes overlying the foot measuring instrument 22 on the foot locating instrument 20, and aligning the foot measuring instrument 22 to the foot outline L10 on the foot locating instrument 20 using the heel alignment points 42 and the shoe reference outline 46 on the foot measuring instrument 22. Specifically, before this procedure, foot sizes of the person's feet FL and FR are measured in a conventional manner. Furthermore, hereinafter, the bicycle cleat positioning method applied to the person's left foot FL is identical to the bicycle cleat positioning method applied to the person's right foot FR. Thus, only the bicycle cleat positioning method applied to the person's left foot FL will be discussed herein for the sake of brevity.

As illustrated in FIG. 11, the foot measuring instrument 22 is aligned with respect to the foot locating instrument 20 such that one of the heel alignment points 42 that corresponds to the measured foot size of the person's left foot FL is aligned to the heel center position P12 of the foot outline L10. Then, the foot measuring instrument 22 is pivotally pined to the foot locating instrument 20 at the one of the heel alignment points 42 with a pinning instrument, such as a pin, a tip of a pen, and the like. Furthermore, the foot measuring instrument 22 is pivoted in a clockwise direction or a counterclockwise direction about the one of the heel alignment points 42 such that the alignment section 48 of the shoe reference outline 46 is located on an inside portion of the foot outline L10 on the foot locating instrument 20, as illustrated in FIG. 12. The alignment section 48 is wider than the shoe reference outline 46, and is about two millimeter wide. Thus, the alignment section 48 is easily aligned to the inside portion of the foot outline L10 such that the alignment section 48 overlaps the inside portion of the foot outline L10. Here, the alignment section 48 of the shoe reference outline 46 represents an inside portion of a foot outline. However, the foot measuring instrument 22 can alternatively include an alignment section of a show reference outline that represents an outside portion of a foot outline. In this case, the foot measuring instrument 22 is pivoted to align the alignment section of the shoe reference outline to the outside portion of the foot outline.

Figure 13:
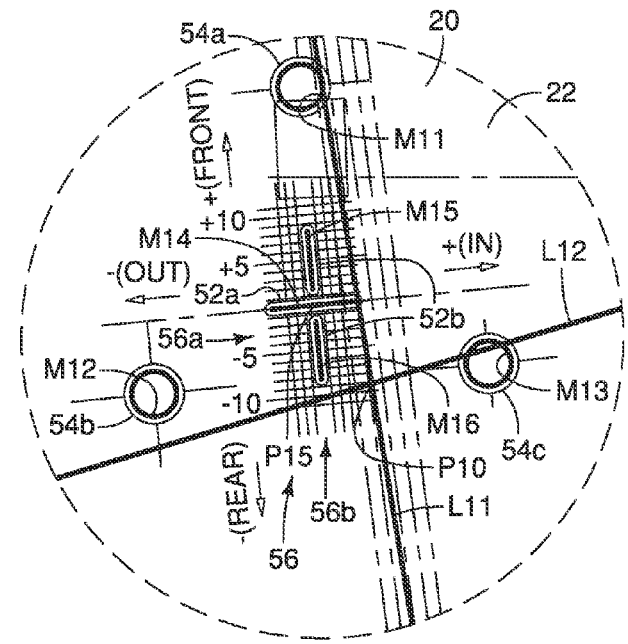
FIG. 13 is an enlarged view of an encircled portion XIII in FIG. 12, illustrating a positional displacement of a center point of the foot outline of the person's foot on the foot locating instrument with respect to a reference point on the foot measuring instrument measured by the foot measuring instrument.

Next, as illustrated in FIG. 13, the bicycle cleat positioning method further includes marking the foot locating instrument 20 with circular marks M11, M12 and M13, and linear marks M14, M15 and M16. The circular marks M11, M12 and M13 are traced on the foot locating instrument 20 through the reference apertures 54a, 54b and 54c on the foot locating instrument 20, respectively. The circular marks M11, M12 and M13 represent positions of the cleat attachment holes (e.g., cleat attachment locations) on the shoe sole 16 of the bicycle shoe 14 with respect to the foot outline L10. The linear marks M14, M15 and M16 are traced on the foot locating instrument 20 through the reference slits 52a and 52b on the foot locating instrument 20, respectively. The linear marks M14, M15 and M16 represent the reference point P15 of the cleat attachment location (e.g., center position of the cleat attachment holes) on the shoe sole 16 of the bicycle shoe 14 with respect to the foot outline L10. In particular, an intersection of an axis extending along the linear mark M14 and an axis extending along the linear marks M15 and M16 indicates the reference point P15 of the cleat attachment location.

Furthermore, as illustrated in FIG. 13, the bicycle cleat positioning method further includes measuring the positional displacement of the center point P10 of the foot outline L10 on the foot locating instrument 20 with respect to the reference point P15 of the cleat attachment location indicated by the linear marks M14, M15 and M16 on the foot measuring instrument 22. The positional displacement of the center point P10 with respect to the reference point P15 of the cleat attachment location is measured by the positional displacement indicator 56. In particular, the positional displacement indicator 56 includes fine lines making up a regular grid with the reference point P15 of the cleat attachment location as the origin of the regular grid. The positional displacement indicator 56 includes a longitudinal position scale 56a (e.g., first measuring scale) and a transverse position scale 56b (e.g., second measuring scale). The longitudinal position scale 56a includes parallel lines extending in the widthwise (or transverse) direction D2 of the foot measuring instrument 22. The longitudinal position scale 56a measures a longitudinal displacement between the center point P10 and the reference point P15 of the cleat attachment location in the lengthwise (or longitudinal) direction D1 of the foot measuring instrument 22. For example, in FIG. 13, the longitudinal position scale 56a indicates that the longitudinal displacement is "−9." Then, the longitudinal displacement value is written down in the left parameter table 30L in FIG. 2 as a parameter value of the "F/R CLEAT POSITION," Furthermore, the transverse position scale 56b includes parallel lines extending in the lengthwise direction D1 of the foot measuring instrument 22. The transverse position scale 56b measures a transverse displacement between the center point P10 and the reference point P15 of the cleat attachment location in the widthwise direction D2 of the foot measuring instrument 22. For example, in FIG. 13, the transverse position scale 56b indicates that the transverse displacement is "6." Then, the transverse displacement value is written down in the left parameter table 30L in FIG. 2 as a parameter value of the "IN/OUT CLEAT POSITION" Here, with the positional displacement indicator 56, a lengthwise direction approaching the toe is defined as a positive lengthwise direction, and a widthwise direction approaching the left crank arm reference indicator 28L is defined as a positive widthwise direction.

Figure 14:
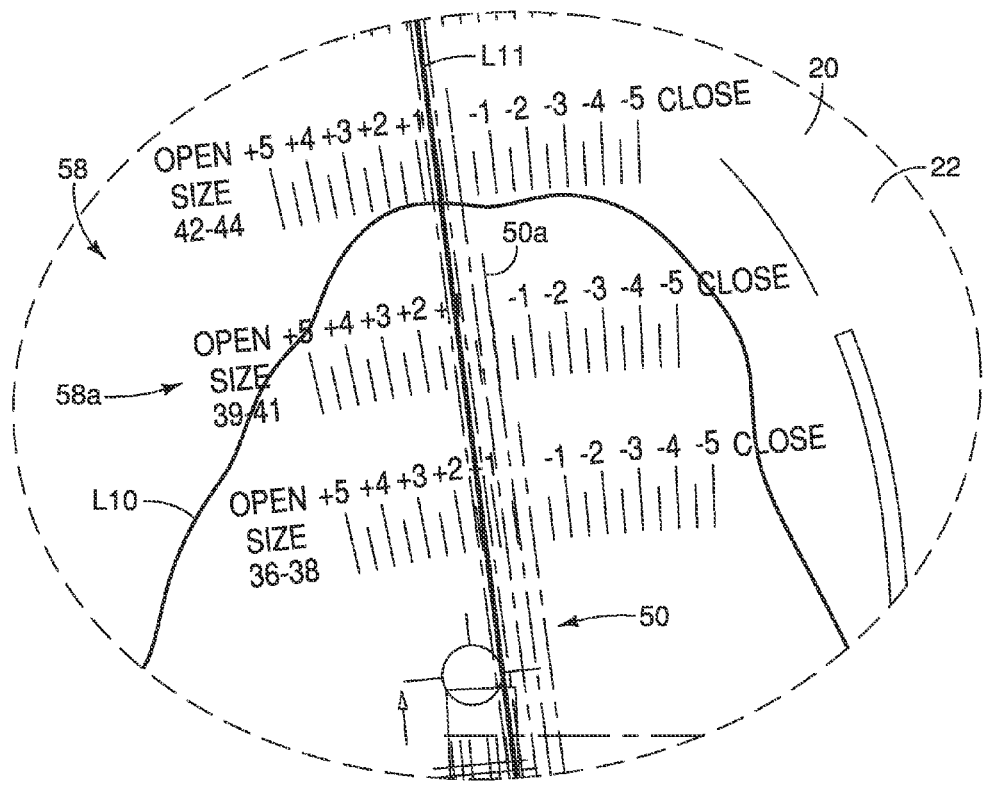
FIG. 14 is an enlarged view of an encircled portion XIV in FIG. 12, illustrating an angular displacement of the center line of the foot outline of the person's foot on the foot locating instrument with respect to a shoe reference line on the foot measuring instrument measured by the foot measuring instrument.

Next, as illustrated in FIG. 14, the bicycle cleat positioning method further includes measuring an angular displacement of the center line L11 of the foot outline L10 on the foot locating instrument 20 with respect to one of the shoe reference lines 50 that corresponds to the measured foot size of the person's foot FL. For example, when the measured foot size is "40," then the angular displacement of the center line L11 of the foot outline L10 with respect to a shoe reference line 50a of the shoe reference lines 50 is measured with an angular scale 58a of the angular displacement indicator 58, as illustrated in FIG. 14. The shoe reference line 50a of the shoe reference lines 50 passes through one of the heel alignment points 42 corresponding to the measured foot size "40." The angular scale 58a of the angular displacement indicator 58 is provided corresponding to a foot size interval "39-41." For example, in FIG. 14, the angular scale 58a indicates that the angular displacement is "+1." Then, the angular displacement value is written down in the left parameter table 30L in FIG. 2 as a parameter value of the "FOOT-SHOES ANGLE," With the angular displacement indicator 58, a rotational direction that makes the stance more open relative to the left crank arm reference indicator 28L is defined as a positive direction.

Figure 16:
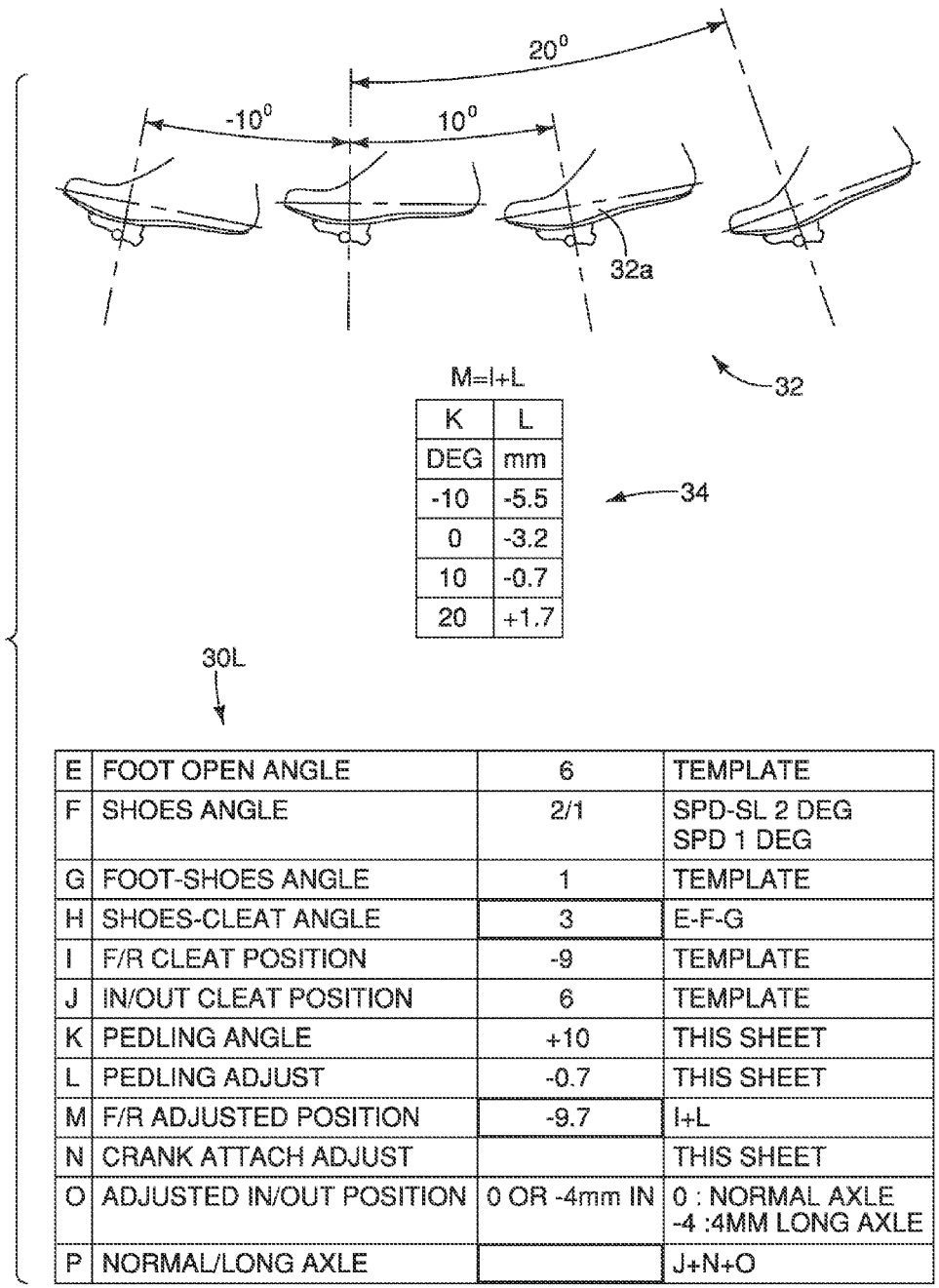
FIG. 16 is enlarged views of a graphic diagram indicative of pedaling angles, a first parameter chart of adjustment values corresponding to the pedaling angles, and the left parameter table on the foot locating instrument illustrated in FIG. 2, illustrating a parameter value calculated based on the first parameter chart recorded on the left parameter table.

As illustrated in FIGS. 15 to 17, the bicycle cleat positioning method further includes calculating the parameter values of the "SHOES-CLEAT ANGLE," the "F/R ADJUSTIED POSITION," and the "NOMAL/LONG AXLE" for the cleat setting device 10. First, as illustrated in FIG. 15, the parameter value of the "SHOES-CLEAT ANGLE" is calculated based on the parameter values of the "FOOT OPEN ANGLE," the "SHOES ANGLE," and the "FOOT-SHOES ANGLE" by subtracting the parameter values of the "SHOES ANGLE" and the "FOOT-SHOES ANGLE" from the parameter value of the "FOOT OPEN ANGLE" The parameter value of the "FOOT OPEN ANGLE" is measured using the foot opening angle scale 40b as illustrated in FIG. 10, and the parameter value of the "FOOT SHOES ANGLE" is measured using the angular displacement indicator 58 as illustrated in FIG. 14. Furthermore, the parameter value of the "SHOES ANGLE" is determined by a cleat type of the cleat 12. In particular, if the cleat type of the cleat 12 is "SPD-SL," then the parameter value of the "SHOES ANGLE" is set to "2." On the other hand, if the cleat type of the cleat 12 is "SPD," then the parameter value of the "SHOES ANGLE" is set to "1."

For example, as illustrated in FIG. 15, the parameter value of the "FOOT OPEN ANGLE" is measured as "6," and the parameter value of the "FOOT-SHOES ANGLE" is measured as "1." Furthermore, the parameter value of the "SHOES ANGLE" is set to "2." Thus, the parameter value of the "SHOES-CLEAT ANGLE" is calculated as "3". Then, the parameter value of the "SHOES-CLEAT ANGLE" is written down in the left parameter table 30L as illustrated in FIG. 15.

Next, as illustrated in FIG. 16, the parameter value of the "F/R ADJUSTIED POSITION" is calculated based on the parameter values of the "F/R CLEAT POSITION" and the "PEDALING ADJUST" by adding the parameter values of the "F/R CLEAT POSITION" and the "PEDALING ADJUST." The parameter value of the "F/R CLEAT POSITION" is measured using the longitudinal position scale 56a as illustrated in FIG. 13. The parameter value of the "PEDALING ADJUST" is determined by the parameter value of the "PEDALING ANGLE" and the first parameter chart 34 as illustrated in FIG. 16. In particular, the parameter value of the "PEDALING ANGLE" is determined by a foot posture of the person's foot while pedaling as illustrated in the graphic diagram 32. For example, the person or a cleat fitter who adjusts the cleat observes the foot posture of the person's foot while pedaling, and determines the parameter value of the "PEDALING ANGLE" from alternatives ("−10," "0," "10," or "20") illustrated in the graphic diagram 32. The first parameter chart 34 provides the parameter values of the "PEDALING ADJUST" corresponding to the parameter values of the "PEDALING ANGLE" The parameter values of the "PEDALING ADJUST" are predetermined such that the cleat 12 is placed vertically below the center point of the person's foot even if the center point of the person's foot is displaced around the pedaling axle in accordance with the pedaling angles of the person's foot.

For example, as illustrated in FIG. 16, the parameter value of the "F/R CLEAT POSITION" is measured as "−9." Furthermore, the parameter value of the "PEDALING ADJUST" is set to "−0.7" when the foot posture of the person's foot is determined as a posture 32a, and the parameter value of the "PEDALING ANGLE" is determined as "+10." Thus, the parameter value of the "F/R ADJUSTIED POSITION" is calculated as "−9.7". Then, the parameter value of the "F/R ADJUSTIED POSITION" is written down in the left parameter table 30L as illustrated in FIG. 16.

Furthermore, as illustrated in FIG. 17, the parameter value of the "NOMAL/LONG AXLE" is calculated based on the parameter values of the "IN/OUT CLEAT POSITION," the "CRANK ATTACH ADJUST," and the "ADJUSTED IN/OUT POSITION" by adding the parameter values of the "IN/OUT CLEAT POSITION," the "CRANK ATTACH ADJUST" and the "ADJUSTED IN/OUT POSITION," The parameter value of the "IN/OUT CLEAT POSITION" is measured using the transverse position scale 56b as illustrated in FIG. 13. The parameter value of the "CRANK ATTACH ADJUST" is determined by the parameter value of the "SHOES-CLEAT ANGLE" and the second parameter chart 36 as illustrated in FIG. 17. The second parameter chart 36 provides the parameter values of the "CRANK ATTACH ADJUST" corresponding to different parameter values of the "SHOES-CLEAT ANGLE." The parameter values of the "CRANK ATTACH ADJUST" in the second parameter chart 36 are predetermined such that the parameter values of the "CRANK ATTACH ADJUST" compensates the transverse displacements of the cleat 12 due to the angular displacements (e.g., "SHOES-CLEAT ANGLE") of the cleat 12 with respect to the bicycle shoe 14. The parameter value of the "ADJUSTED IN/OUT POSITION" is also determined by the parameter value of the "SHOES-CLEAT ANGLE." In particular, if the parameter value of the "SHOES-CLEAT ANGLE" is smaller than "3" degrees, then the parameter value of the "ADJUSTED IN/OUT POSITION" is set to "0." On the other hand, if the parameter value of the "SHOES-CLEAT ANGLE" is equal to or greater than "3" degrees, then the parameter value of the "ADJUSTED IN/OUT POSITION" is set to "−4."

For example, as illustrated in FIG. 17, the parameter value of the "IN/OUT CLEAT POSITION" is measured as "6." Furthermore, the parameter value of the "CRANK ATTACH ADJUST" is determined as "1.6" when the parameter value of the "SHOES-CLEAT ANGLE" is calculated as "3." Moreover, the parameter value of the "ADJUSTED IN/OUT POSITION" is set to "−4" when the parameter value of the "SHOES-CLEAT ANGLE" is calculated as "3." Thus, the parameter value of the "NOMAL/LONG AXLE" is calculated as "3.6." Then, the parameter value of the "NOMAL/LONG AXLE" is written down in the left parameter table 30L as illustrated in FIG. 17.

Figure 18:
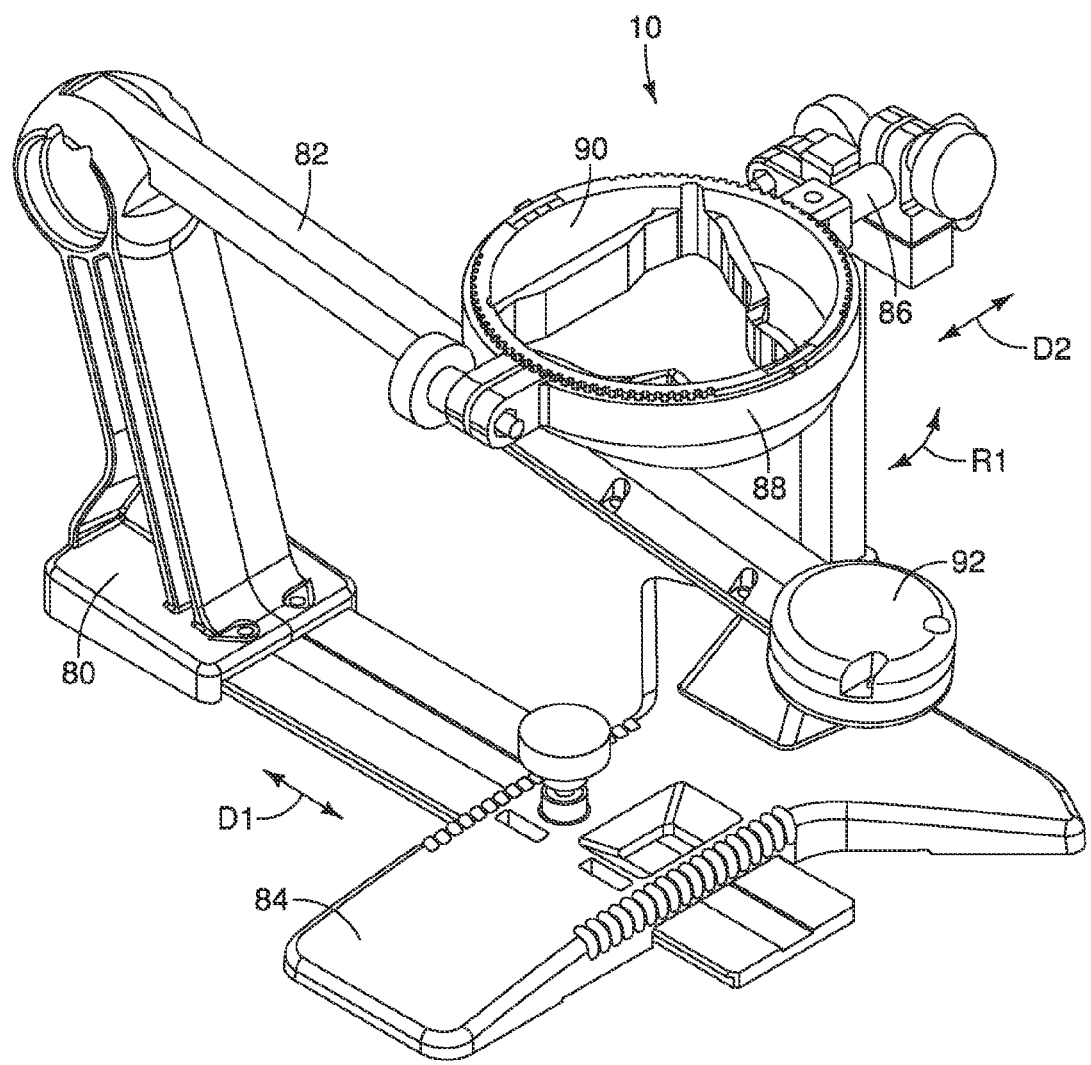
FIG. 18 is a perspective view of the cleat setting device illustrated in FIG. 1.

Furthermore, as illustrated in FIG. 18, the bicycle cleat positioning method further includes adjusting the cleat 12 with respect to the bicycle shoe 14 based on the parameter values of the "SHOES-CLEAT ANGLE," the "FR ADJUSTIED POSITION," and the "NOMAL/LONG AXLE" using the cleat setting device 10. In particular, as illustrated in FIG. 18, the cleat setting device 10 includes a base component 80 with a shoe holder 82, a lengthwise slide component 84, a widthwise slide component 86 with an attachment portion 88, and a cleat holder 90. The shoe holder 82 of the base component 80 further has an expandable toe part 92. The shoe holder 82 is disposed inside the bicycle shoe 14 to hold the bicycle shoe 14 with respect to the cleat setting device 10. The lengthwise slide component 84 is slidably coupled to the base component 80 along the lengthwise direction D1 of the bicycle shoe 14. The widthwise slide component 86 is slidably coupled to the lengthwise slide component 84 along the widthwise direction D2 of the bicycle shoe 14. The cleat holder 90 is rotatably coupled to the attachment portion 88 of the widthwise slide component 86 in the rotational direction R1 about a center of the attachment portion 88. The base component 80 further has a lengthwise scale indicative of a lengthwise position of the cleat holder 90 with respect to the shoe holder 82. The widthwise slide component 86 further has a widthwise scale indicative of a widthwise position of the cleat holder 90 with respect to the shoe holder 82. The attachment portion 88 further has an angular scale indicative of a rotational orientation of the cleat holder 90.

When the bicycle shoe 14 is mounted to the shoe holder 82 and the cleat 12 is mounted to the cleat holder 90, the lengthwise slide component 84 and the widthwise slide component 86 are adjusted to a reference cleat attachment position on the shoe sole 16 of the bicycle shoe 14 that corresponds to the reference point P15 represented by the reference slits 52a and 52b as illustrated in FIG. 13. Furthermore, the cleat holder 90 is adjusted to a reference orientation with respect to the attachment portion 88 such that the angular scale indicates "0" degree. The reference orientation corresponds to a cleat orientation represented by the reference apertures 54a, 54b and 54c as illustrated in FIG. 13. Then, the lengthwise slide component 84 is slidably adjusted in the lengthwise direction D1 by the distance indicated by the parameter value of the "F/R ADJUSTIED POSITION" using the lengthwise scale of the base component 80. Furthermore, the widthwise slide component 86 is slidably adjusted in the widthwise direction D2 by the distance indicated by the parameter value of the "NOMAL/LONG AXLE" using the widthwise scale of the widthwise scale of the widthwise slide component 86. Moreover, the cleat holder 90 is rotatably adjusted in the rotational direction R1 such that the angular scale of the attachment portion 88 indicates the parameter value of the "SHOES-CLEAT ANGLE." After adjusting the cleat 12 with respect to the shoe sole 16 of the bicycle shoe 14 using the cleat setting device 10, the cleat 12 is fastened to the shoe sole 16 of the bicycle shoe 14 with screws.

As described above, the bicycle cleat positioning method applied to the person's left foot FL as illustrated in FIGS. 11 to 18 are also applied to the person's right foot FR in a similar manner, except for using the foot measuring instrument 22 by turning over the foot measuring instrument 22 or using an additional foot measuring instrument utilized for the right foot FR. Then, the cleat 12 is adjusted with respect to the bicycle shoe 14 based on the parameter values of the "SHOES-CLEAT ANGLE," the "F/R ADJUSTIED POSITION," and the "NOMAL/LONG AXLE" in the right parameter table 30R for the right foot FR through the bicycle cleat positioning method as illustrated in FIGS. 11 to 18.

In this embodiment, the bicycle cleat positioning kit includes the foot locating instrument 20 made of a sheet member as illustrated in FIGS. 2 and 8. Furthermore, in this embodiment, the bicycle cleat positioning method includes manually tracing the foot outlines L10 of the person's feet FL and FR on the foot locating instrument 20 and manually determining the center lines L11, the center points P10 and the heel center positions P12 of the foot outlines of the person's feet FL and FR. On the other hand, additionally or alternatively, the bicycle cleat positioning kit can also include a foot scan system or a pedograph that automatically traces and provides the foot outlines L10 of the person's feet FL and FR by sensing foot pressure from the person's feet FL and FR. Furthermore, the foot scan system or the pedograph can also automatically determine the center lines L11, the center points P10 and the heel center positions P12 of the foot outlines L10 of the person's feet FL and FR based on the foot outlines L10.

Second Embodiment

Referring now to FIGS. 19 to 26, a bicycle cleat positioning method in accordance with a second embodiment will now be explained.

In view of the similarity between the first and second embodiments, the parts of the second embodiment that are identical to the parts of the first embodiment will be given the same reference numerals as the parts of the first embodiment. In any event, the descriptions of the parts of the second embodiment that are substantially identical to the parts of the first embodiment may be omitted for the sake of brevity. However, it will be apparent to those skilled in the art from this disclosure that the descriptions and illustrations of the first embodiment also apply to this second embodiment, except as discussed and/or illustrated herein.

The bicycle cleat positioning method in accordance with the second embodiment basically includes the bicycle cleat positioning method described with reference to FIGS. 7 to 15 in accordance with the first embodiment. In other words, the foot outlines L10, the center lines L11, the transverse lines L12, and the center point P10 as illustrated in FIG. 8, the circular marks M11, M12 and M13 as illustrated in FIG. 13, and the parameter values of the "FOOT OPEN ANGLE" and the "SHOES-CLEAT ANGLES" of the left and right parameter tables 30L and 30R as illustrated in FIG. 15 are already obtained through the bicycle cleat positioning method as illustrated in FIGS. 7 to 15 before the bicycle cleat positioning method as illustrated in FIGS. 19 to 26. The bicycle cleat positioning method as illustrated in FIGS. 19 to 26 utilizes the cleat adjusting instrument 24 for adjusting the cleat 12 with respect to the shoe sole 16 of the bicycle shoe 14 instead of utilizing the cleat setting device 10. Hereinafter, the bicycle cleat positioning method applied to the person's left foot FL is identical to the bicycle cleat positioning method applied to the person's right foot FR. Thus, only the bicycle cleat positioning method applied to the person's left foot FL will be discussed herein for the sake of brevity.

Figure 19:
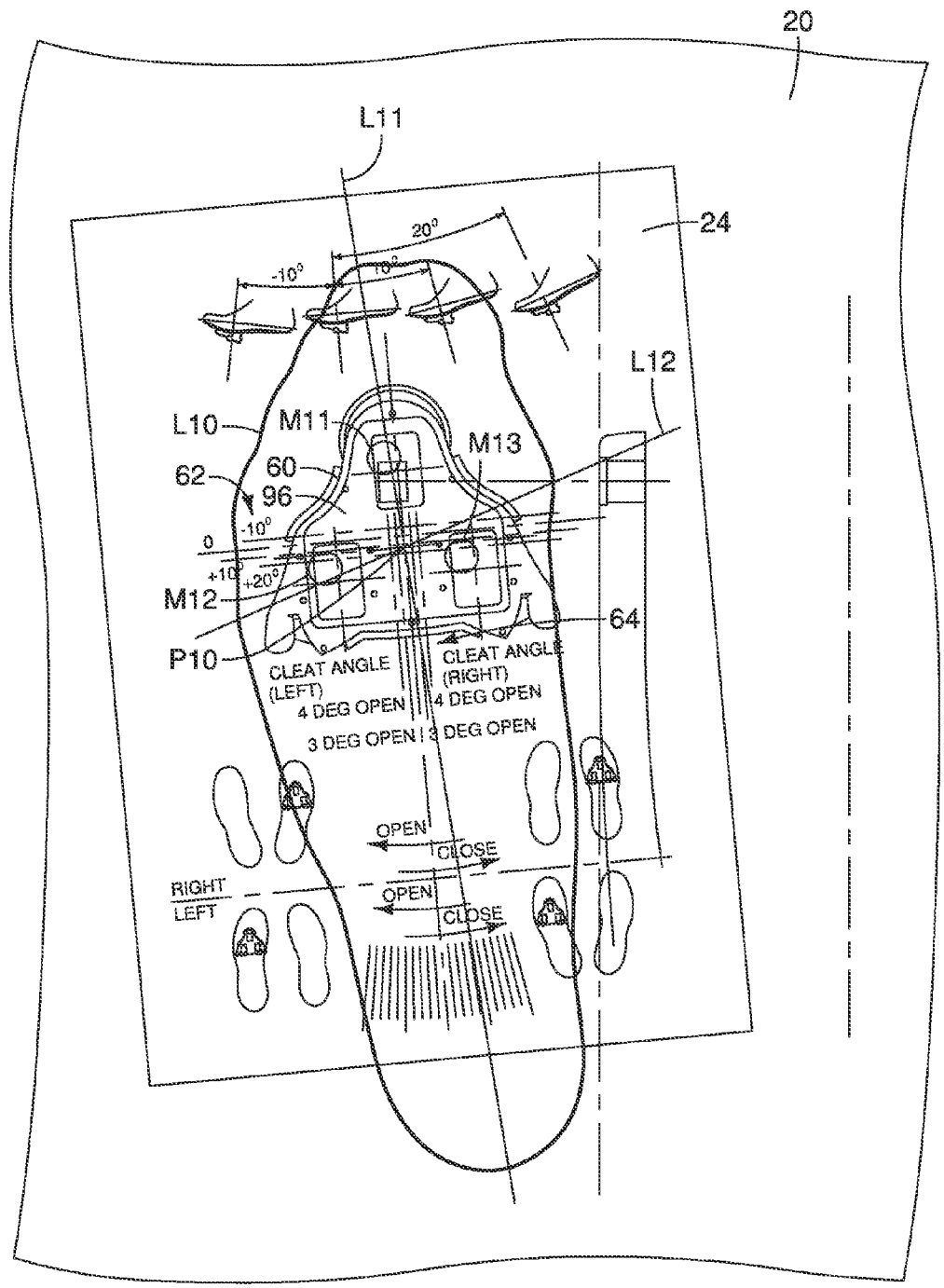
FIG. 19 is a top plan view of the foot locating instrument illustrated in FIG. 2 and the cleat adjusting instrument illustrated in FIG. 4 in accordance with a second embodiment, illustrating the cleat adjusting instrument overlaid on the foot locating instrument.

As illustrated in FIG. 19, the bicycle cleat positioning method includes providing an attachment sheet 96 to the cleat adjusting instrument 24. The attachment sheet 96 is preferably made of a transparent or translucent sticker. The attachment sheet 96 is detachably disposed on the cleat reference indicator 60 on the cleat adjusting instrument 24. The attachment sheet 96 is disposable and replaceable after tracing the circular marks M11, M12 and M13 on the attachment sheet 96.

Furthermore, as illustrated in FIGS. 19 to 23, the bicycle cleat positioning method includes overlying the cleat adjusting instrument 24 on the foot locating instrument 20, adjusting the cleat adjusting instrument 24 with respect to the circular marks M11, M12 and M13 (e.g., cleat attachment locations) that has been provided on the foot locating instrument 20, and tracing the circular marks M11, M12 and M13 on the cleat adjusting instrument 24.

Figure 20:
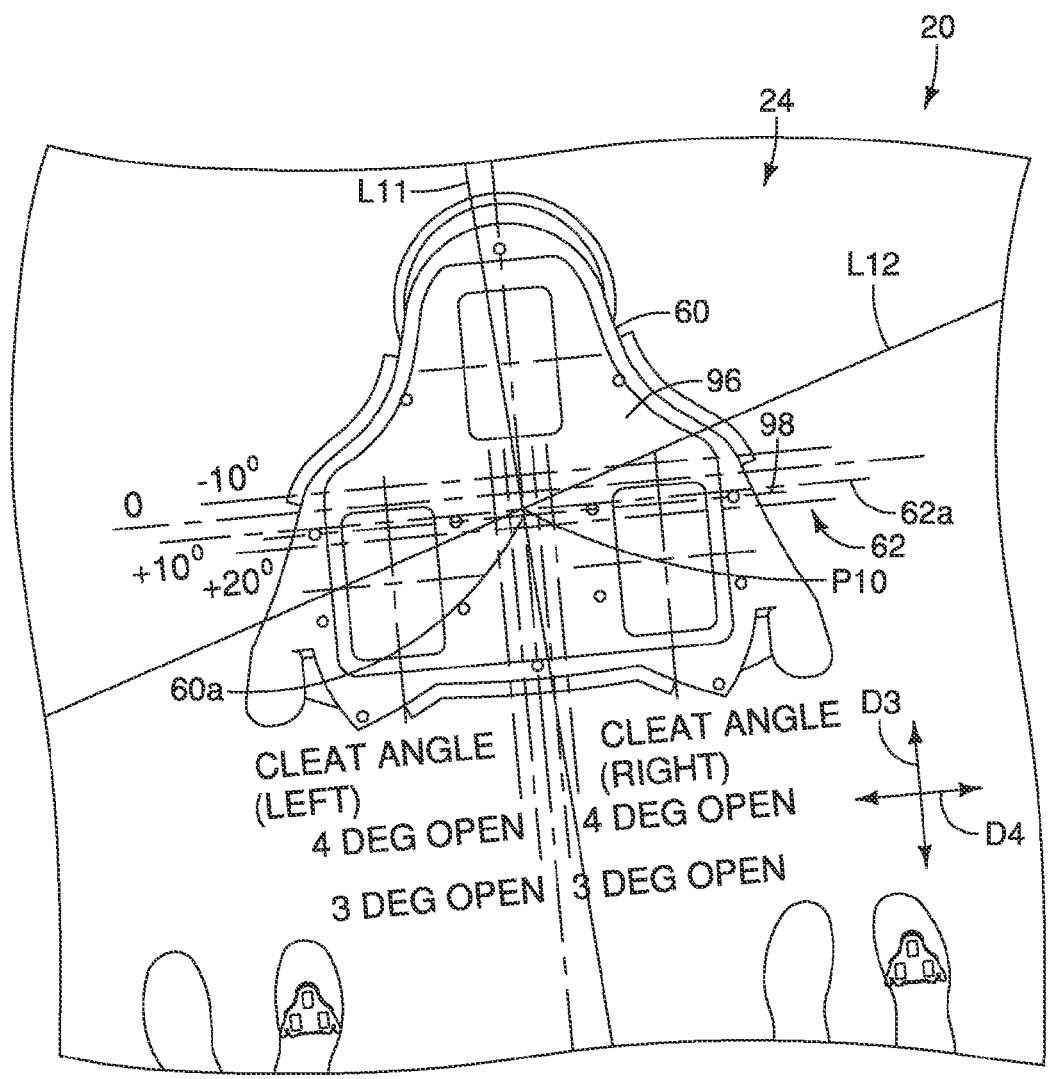
FIG. 20 is an enlarged view of the cleat adjusting instrument illustrated in FIG. 4, illustrating the cleat adjusting instrument aligned to the center point of the foot outline of the person's foot on the foot locating instrument in a lengthwise direction of the cleat adjusting instrument.
Figure 21:
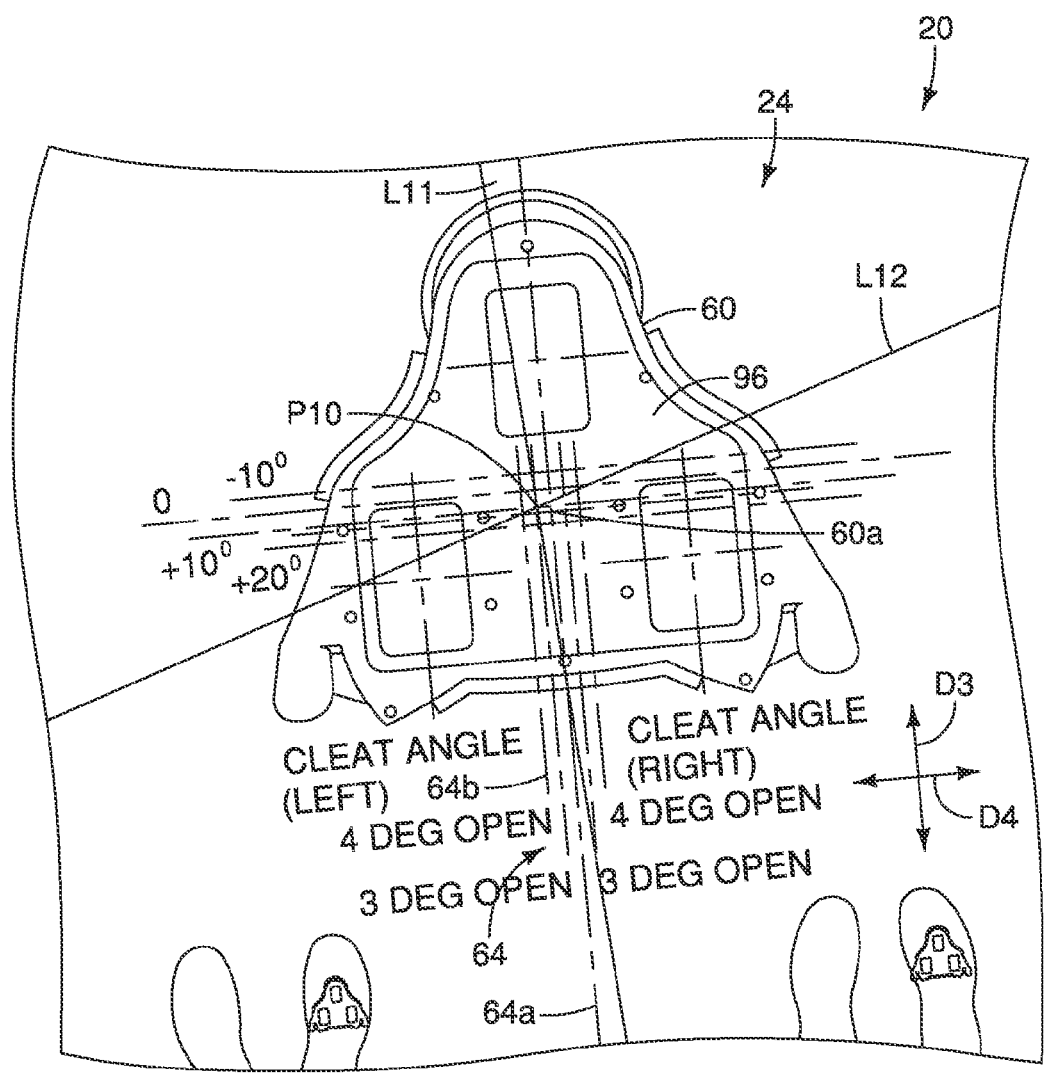
FIG. 21 is an enlarged view of the cleat adjusting instrument illustrated in FIG. 4, illustrating the cleat adjusting instrument aligned to the center point of the foot outline of the person's foot on the foot locating instrument in a widthwise direction of the cleat adjusting instrument.

Specifically, after the cleat adjusting instrument 24 is overlaid on the foot locating instrument 20, the lengthwise position alignment indicators 62 and the widthwise position alignment indicators 64 are aligned to the center point P10 of the foot outline L10 as illustrated in FIGS. 19 to 21.

First, as illustrated in FIG. 20, the cleat reference indicator 60 is adjusted in the lengthwise direction D3 using the lengthwise position alignment indicators 62. The lengthwise position alignment indicators 62 are provided corresponding different pedaling angles. Specifically, as illustrated in FIG. 20, four lengthwise position alignment indicators 62 are provided corresponding to different pedaling angles of "−10," "0," "+10" and "+20," respectively. The pedaling angle is determined by the foot posture of the person's foot while pedaling. For example, the person or the cleat fitter who adjusts the cleat 12 to the bicycle shoe 14 observes the foot posture of the person's foot while pedaling, and determines the pedaling angle from alternatives ("−10," "0," "10" and "20") with reference to a graphic diagram on the cleat adjusting instrument 24. The graphic diagram is the same as the graphic diagram 32 (see FIG. 2, for example). The cleat reference indicator 60 is adjusted with respect to the foot locating instrument 20 in the lengthwise direction D3 such that the center point P10 on the foot locating instrument 20 is aligned to one of the lengthwise position alignment indicators 62 that corresponds to determined pedaling angle. The lengthwise position alignment indicators 62 are arranged with respect to a lengthwise reference indicator 98 such that distances between the lengthwise position alignment indicators 62 and the lengthwise reference indicator 98 correspond to the parameter values of the "PEDALING ADJUST" in the first parameter chart 34 in FIG. 16, respectively. The lengthwise reference indicator 98 represents a lengthwise position of a cleat attachment reference position 60a of the cleat reference indicator 60. Furthermore, the lengthwise position alignment indicators 62 corresponding to the parameter values of "−10," "0" and "+10" are located on a toe side of the foot outline L10 in the lengthwise direction D3 with respect to the lengthwise reference indicator 98 such that the cleat reference indicator 60 is adjusted toward a heel side of the foot outline L10 in the lengthwise direction D3 when the center point P10 is located on one of the lengthwise position alignment indicators 62 corresponding to the parameter values of "−10," "0" and "+10." On the other hand, the lengthwise position alignment indicator 62 corresponding to the parameter value of "+20" is located on the heel side of the foot outline L10 in the lengthwise direction D3 with respect to the lengthwise reference indicator 98 such that the cleat reference indicator 60 is adjusted toward the toe side of the foot outline L10 in the lengthwise direction D3 when the center point P10 is located on the lengthwise position alignment indicator 62 corresponding to the parameter value of "+20."

For example, as illustrated in FIG. 20, the cleat reference indicator 60 is adjusted with respect to the foot locating instrument 20 in the lengthwise direction D3 such that the center point P10 on the foot locating instrument 20 is aligned to a lengthwise position alignment indicator 62a corresponding to the pedaling angle of "+10" when the determined pedaling angle is "+10."

Next, as illustrated in FIG. 21, the cleat reference indicator 60 is adjusted in the widthwise direction D4 using the widthwise position alignment indicators 64. The widthwise position alignment indicators 64 are provided corresponding different cleat angles with respect to the bicycle shoe 14. Specifically, as illustrated in FIG. 21, five widthwise position alignment indicators 64 are provided corresponding to different parameter values of the "SHOES-CLEAT ANGLE" in left and right parameter tables 30L and 30R. In particular, two of the widthwise position alignment indicators 64 are provided corresponding to the cleat angles of "3" and "4" for the left foot FL, and two of the widthwise position alignment indicators 64 are provided corresponding to the cleat angles of "3" and "4" for the right foot FR. One widthwise position alignment indicator 64a is provided corresponding to the cleat angles less than "3" degrees for the left and right feet FL and FR. The widthwise position alignment indicator 64a passes through the cleat attachment reference position 60a of the cleat reference indicator 60 and represents a widthwise position of the cleat attachment reference position 60a of the cleat reference indicator 60. The parameter value of the "SHOES-CLEAT ANGLE" is calculated as explained with reference to FIG. 15. Then, the cleat reference indicator 60 is adjusted with respect to the foot locating instrument 20 in the widthwise direction D4 such that the center point P10 on the foot locating instrument 20 is aligned to one of the widthwise position alignment indicators 64 that corresponds to the determined parameter value of the "SHOES-CLEAT ANGLE." The widthwise position alignment indicators 64 are arranged such that distances between the widthwise position alignment indicators 64 and the cleat attachment reference position 60a in the widthwise direction D4 correspond to the parameter values of the "CRANK ATTACH ADJUST" in the second parameter chart 36 in FIG. 17, respectively. Furthermore, two of the widthwise position alignment indicators 64 for the left foot FL are located on a left side of the widthwise position alignment indicator 64a in the widthwise direction D4 such that the cleat reference indicator 60 is inwardly adjusted towards the left crank arm reference indicators 28L in the widthwise direction D4 when the center point P10 is located on one of the widthwise position alignment indicators 64 for the left foot FL. On the other hand, two of the widthwise position alignment indicators 64 for the right foot FR are located on a right side of the widthwise position alignment indicator 64a in the widthwise direction D4 such that the cleat reference indicator 60 is inwardly adjusted toward the right crank arm reference indicator 28R in the widthwise direction D4 when the center point P10 is located on one of the widthwise position alignment indicators 64 for the right foot FR.

For example, as illustrated in FIG. 21, the cleat reference indicator 60 is adjusted with respect to the foot locating instrument 20 in the widthwise direction D4 such that the center point P10 on the foot locating instrument 20 is aligned to a widthwise position alignment indicator 64b corresponding to the cleat angle of "3" degrees when the determined parameter value of the "SHOES-CLEAT ANGLE" in the left parameter table 30L is "3" degrees. While the cleat reference indicator 60 is adjusted with respect to the foot locating instrument 20 in the widthwise direction D4, the center point P10 is stayed on one of the lengthwise position alignment indicators 62.

Figure 22:
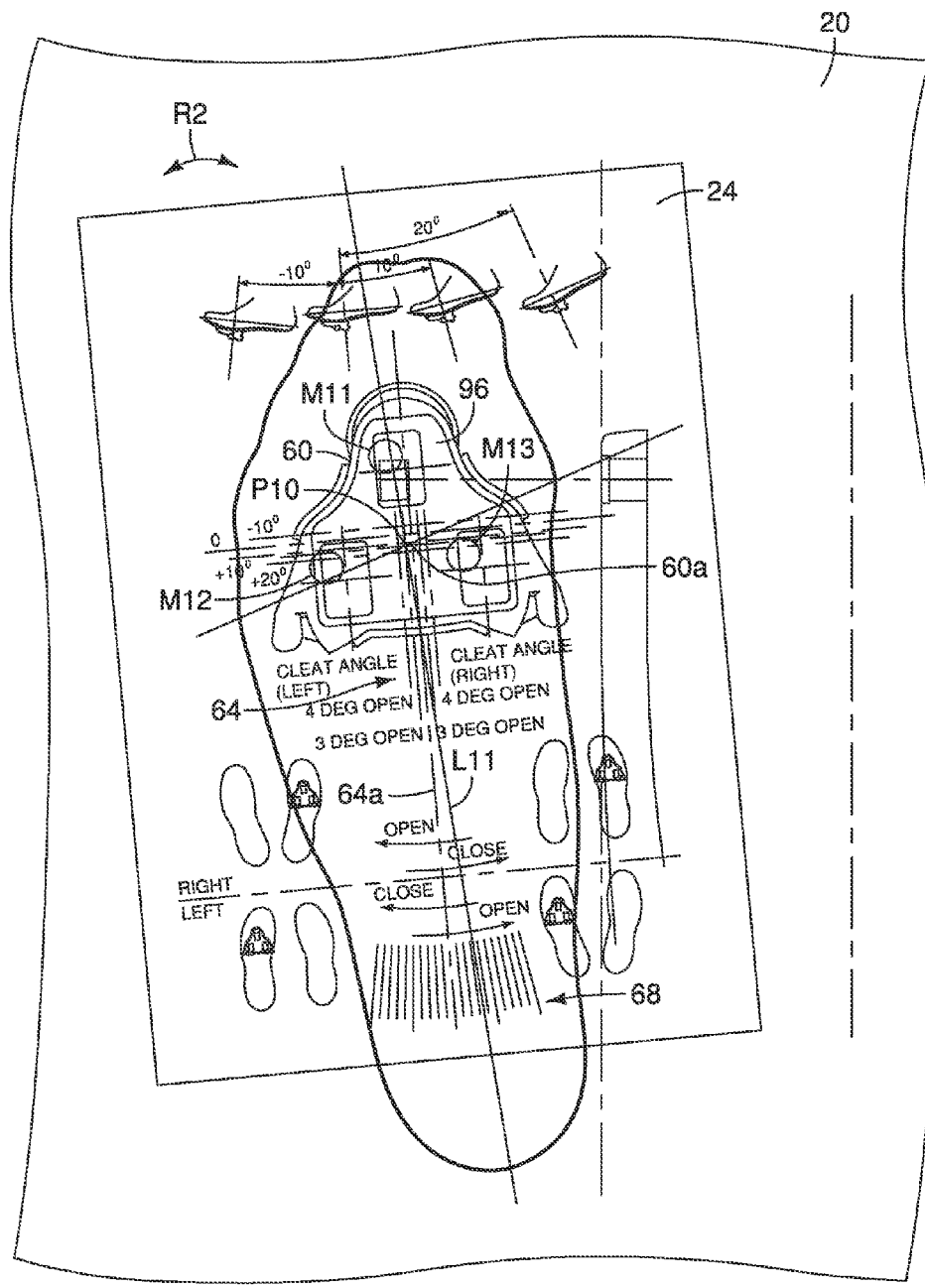
FIG. 22 is an enlarged top plan view of the foot locating instrument illustrated in FIG. 2 and the cleat adjusting instrument illustrated in FIG. 4, illustrating an angular adjustment of the cleat adjusting instrument with respect to the center line of the foot outline of the person's foot on the foot locating instrument.

Furthermore, as illustrated in FIG. 22, the cleat reference indicator 60 is further rotated in a rotational direction R2 about the cleat attachment reference position 60a of the cleat reference indicator 60 such that the cleat orientation alignment indicator 68 is aligned with respect to the center line L11 of the foot outline L10. In particular, the cleat reference indicator 60 is rotated about the cleat attachment reference position 60a such that the center line L11 of the foot outline L10 and the widthwise position alignment indicator 64a that passes through the cleat attachment reference position 60a form an angle corresponding to the parameter value of the "FOOT OPEN ANGLE" in the left parameter table 30L.

For example, as illustrated in FIG. 22, the cleat reference indicator 60 is rotated about the cleat attachment reference position 60a of the cleat reference indicator 60 such that the center line L11 of the foot outline L10 and the widthwise position alignment indicator 64a form an angle of "6" degrees when the parameter value of the "FOOT OPEN ANGLE" in the left parameter table 30L is "6."

Figure 23:
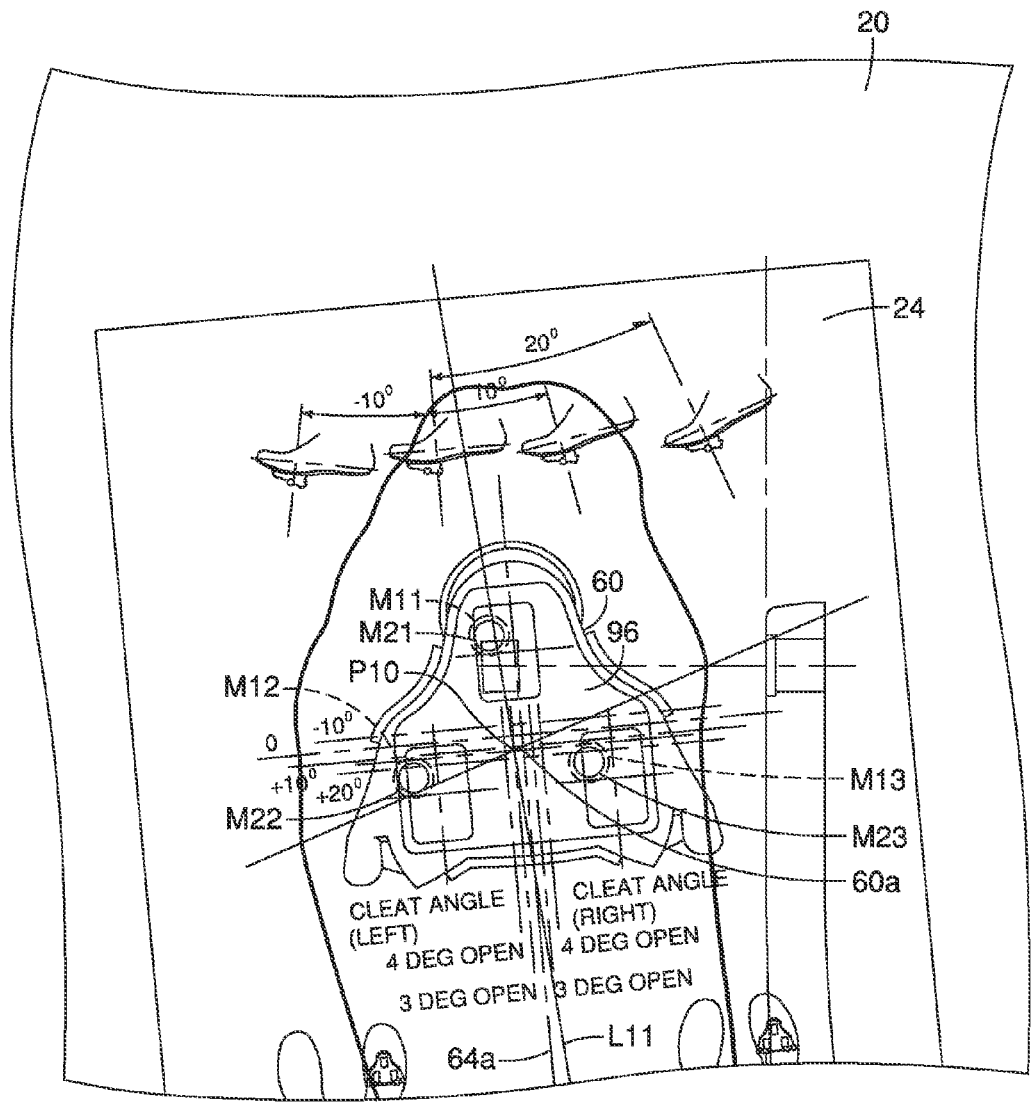
FIG. 23 is an enlarged view of the cleat adjusting instrument illustrated in FIG. 4, illustrating a tracing of circular marks on the cleat adjusting instrument.

With the procedures explained with reference to FIGS. 20 to 22, the cleat adjusting instrument 24 is adjusted with respect to the circular marks M11, M12 and M13 that have been provided on the foot locating instrument 20. Next, as illustrated in FIG. 23, the circular marks M11, M12 and M13 are traced on the cleat adjusting instrument 24. Specifically, the circular marks M11, M12 and M13 are traced on the attachment sheet 96 of the cleat adjusting instrument 24 as circular marks M21, M22 and M23, respectively.

Figure 24:
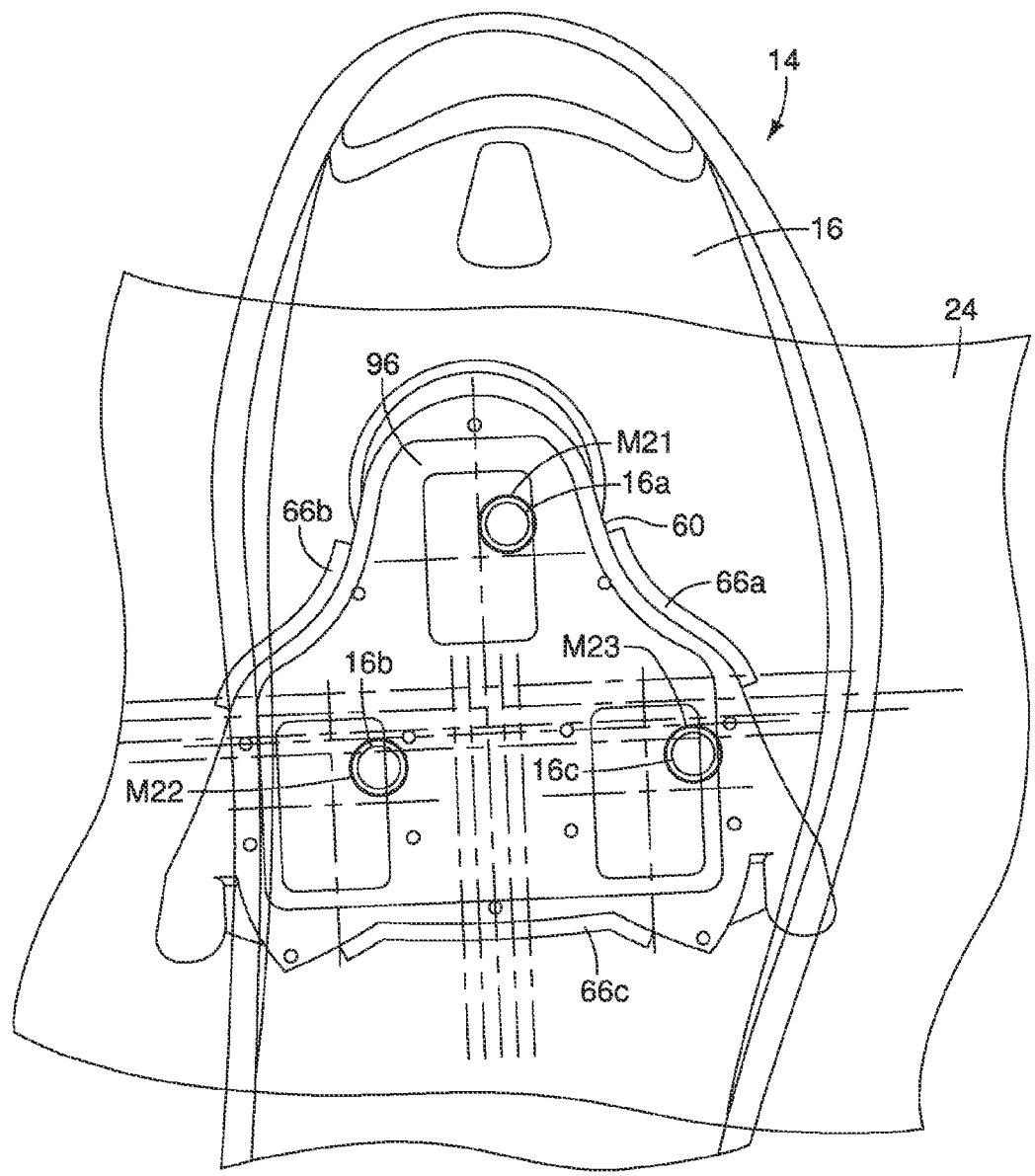
FIG. 24 is an enlarged bottom plan view of the bicycle shoe, illustrating the cleat adjusting instrument overlaid on the shoe sole of the bicycle shoe such that the circular marks traced on the cleat adjusting instrument are aligned to cleat attachment holes of the shoe sole of the bicycle shoe, respectively.

Furthermore, as illustrated in FIG. 24, the bicycle cleat positioning method further includes aligning the circular marks M21, M22 and M23 on the attachment sheet 96 of the cleat adjusting instrument 24 to cleat attachment holes 16a, 16*b* and 16*c* on the shoe sole 16 of the bicycle shoe 14, respectively. Specifically, the cleat adjusting instrument 24 is turned over, and placed on the shoe sole 16 of the bicycle shoe 14. Then, the circular marks M21, M22 and M23 on the attachment sheet 96 of the cleat adjusting instrument 24 are aligned to the cleat attachment holes 16*a*, 16*b* and 16*c* on the shoe sole 16 of the bicycle shoe 14, respectively.

Figure 25:
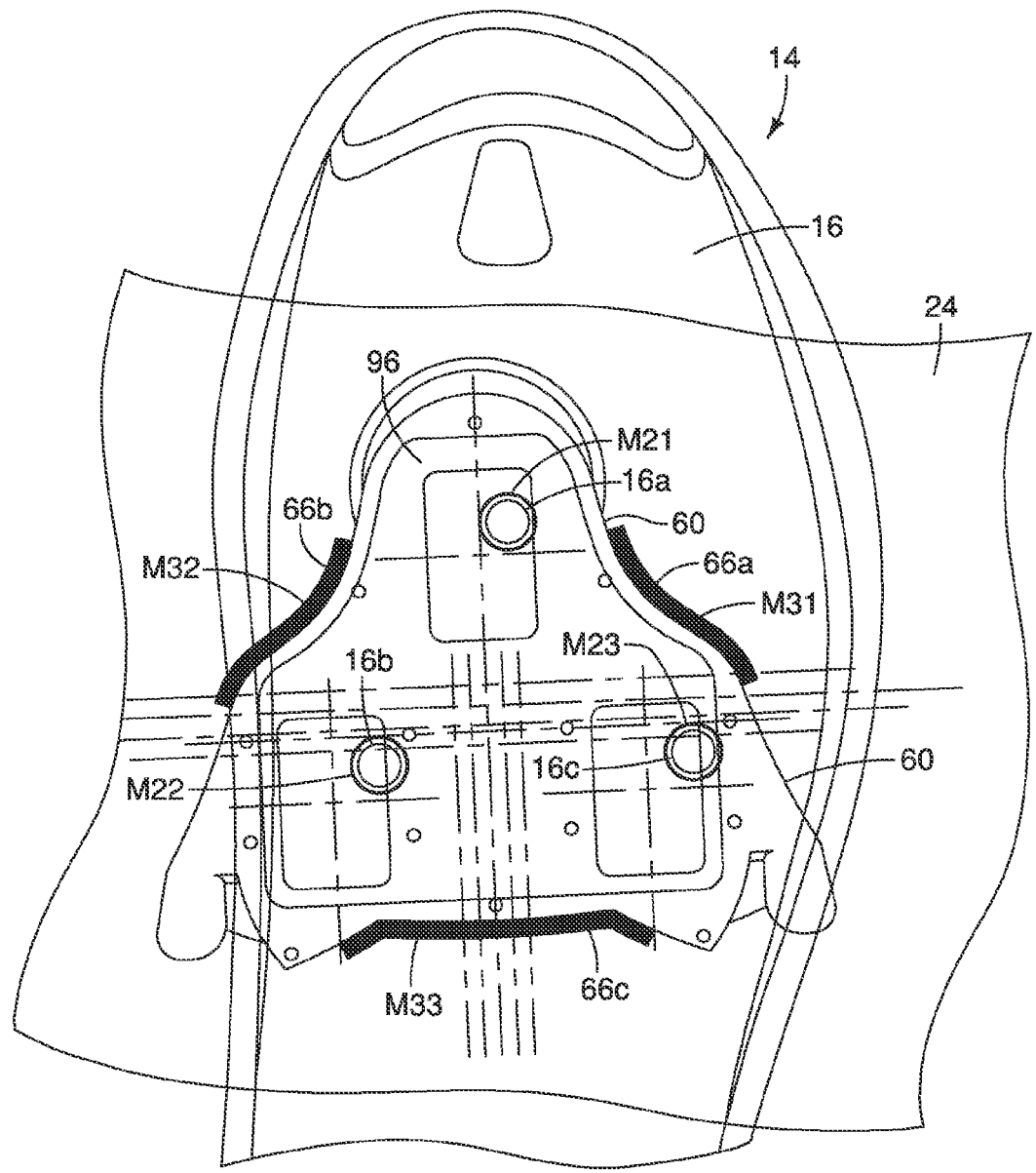
FIG. 25 is an enlarged bottom plan view of the bicycle shoe, illustrating a marking of the shoe sole of the bicycle shoe with positioning marks using the cleat adjusting instrument.
Figure 26:
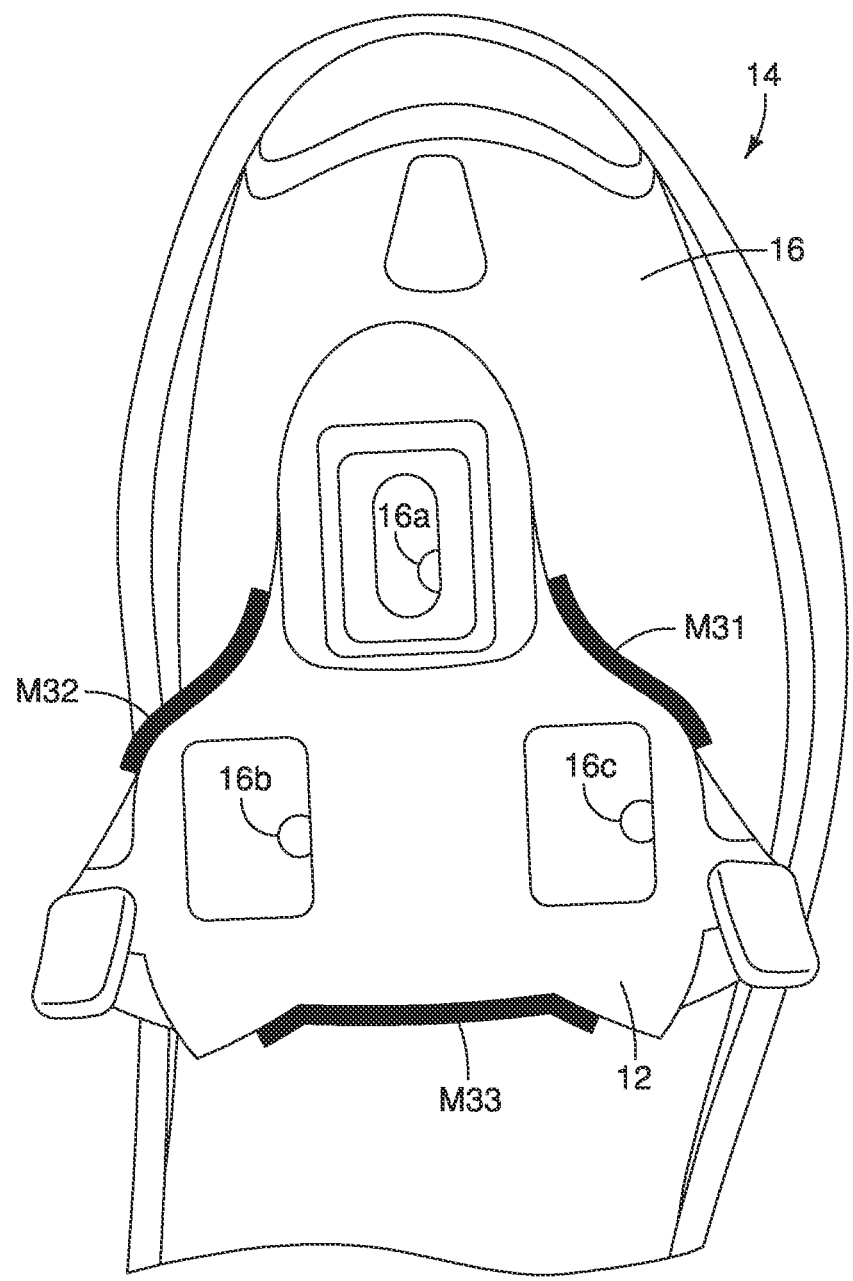
FIG. 26 is an enlarged bottom plan view of the bicycle shoe, illustrating the cleat aligned to the positioning marks provided on the shoe sole of the bicycle shoe.

Moreover, as illustrated in FIG. 25, the bicycle cleat positioning method further includes marking the shoe sole 16 of the bicycle shoe 14 with a plurality of positioning marks M31, M32 and M33 (e.g., cleat outline points) through the positioning slits 66*a*, 66*b* and 66*c* of the cleat adjusting instrument 24, respectively. Then, as illustrated in FIG. 26, the cleat 12 is adjusted with respect to the positioning marks M31, M32 and M33 on the shoe sole 16 of the bicycle shoe 14. Specifically, the cleat 12 is adjusted such that an outline of the cleat 12 are aligned to the positioning marks M31, M32 and M33, respectively. After adjusting the cleat 12 with respect to the shoe sole 16 of the bicycle shoe 14, the cleat 12 is fastened to the shoe sole 16 of the bicycle shoe 14 with screws. If the determined position of the cleat 12 indicated by the positioning marks M31, M32 and M33 is outside an adjustable range of the cleat 12 with respect to the shoe sole 16 of the bicycle shoe 14, then the cleat 12 can be further adjusted to a position within the adjustable range that is closest to the determined position of the cleat 12, and fastened to the shoe sole 16 of the bicycle shoe 14.

The bicycle cleat positioning method applied to the person's left foot FL as illustrated in FIGS. 19 to 26 are also applied to the person's right foot FR in a similar manner.

With the bicycle cleat positioning kit and the bicycle cleat positioning method, the cleats 12 can be adjusted with respect to the bicycle shoes 14 such that the cleats 12 are located vertically blow the center points of the person's feet FL and FR while pedaling.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. A bicycle cleat positioning kit comprising:
  a foot locating instrument including a foot support surface configured and dimensioned for tracing a person's foot; and
  a foot measuring instrument including a transparent sheet member having a foot reference indicator indicative of a foot reference location and a cleat attachment indicator indicative of a cleat attachment location relative to the foot reference indicator, the foot reference indicator and the cleat attachment indicator of the transparent sheet member being configured to be movably disposed on the foot locating instrument to locate the cleat attachment indicator relative to the tracing of the person's foot, the cleat attachment indicator including at least one reference aperture indicative of a cleat attachment hole for attaching the cleat to a bicycle shoe.

2. The bicycle cleat positioning kit according to claim 1, wherein
  the foot support surface has a crank arm reference indicator.

3. The bicycle cleat positioning kit according to claim 2, wherein
  the foot measuring instrument further includes an angular displacement indicator arranged to measure an angular displacement of a center axis of the person's foot on the foot support surface of the foot locating instrument with respect to the crank arm reference indicator on the foot support surface of the foot locating instrument.

4. The bicycle deal positioning kit according to claim 3, wherein
  the shoe reference indicator includes a plurality of shoe reference lines that represent reference orientations of different bicycle shoes, and
  the angular displacement indicator includes a plurality of angular scales arranged to measure an angular displacement of a center line of a foot outline on the foot locating instrument with respect to a corresponding one of the shoe reference lines.

5. The bicycle cleat positioning kit according to claim 2, wherein
  the crank arm reference indicator includes a left crank arm reference indicator and a right crank arm reference indicator, the left and right reference indicators being parallel lines extending in a direction representing a longitudinal direction of the bicycle.

6. The bicycle cleat positioning kit according to claim 5, wherein
  the left crank arm reference indicator and the right crank arm reference indicator are spaced apart from each other by a predetermined distance.

7. The bicycle cleat positioning kit according to claim 5, wherein
  the foot locating instrument includes a foot support portion that receives a person's foot, the foot support portion being located outside of a center area between the left and right crank arm reference indicators.

8. The bicycle cleat positioning kit according to claim 1, wherein
  the foot measuring instrument further includes a shoe reference indicator indicative of a bicycle shoe orientation with respect to the foot reference indicator.

9. The bicycle cleat positioning kit according to claim 8, wherein
  the foot measuring instrument further includes an angular displacement indicator arranged to measure an angular displacement of a center axis of the person's foot on the foot support surface of the foot locating instrument with respect to the shoe reference indicator of the foot measuring instrument.

10. The bicycle cleat positioning kit according to claim 8, wherein
  the foot reference indicator further includes a plurality of heel alignment points representing a plurality of heel center positions of different foot sizes, and
  the shoe reference indicator includes a plurality of shoe reference lines that represent reference orientations of different bicycle shoe sizes, the shoe reference lines passing through corresponding ones of the heel alignment points.

11. The bicycle cleat positioning kit according to claim 1, wherein
the foot measuring instrument further includes a positional displacement indicator arranged to measure a positional displacement of a center point of the person's foot on the foot support surface of the foot locating instrument with respect to a center point of the cleat attachment indicator of the foot measuring instrument.

12. The bicycle cleat positioning kit according to claim 11, wherein
the positional displacement indicator of the foot measuring instrument includes a first measuring scale arranged to measure a first displacement between the center point of the person's foot on the foot support surface of the foot locating instrument and the center point of the cleat attachment indicator of the foot measuring instrument in a first direction of the foot measuring instrument.

13. The bicycle cleat positioning kit according to claim 12, wherein
the positional displacement indicator of the foot measuring instrument further includes a second measuring scale arranged to measure a second displacement between the center point of the person's foot on the foot support surface of the foot locating instrument and the center point of the cleat attachment indicator of the foot measuring instrument in a second direction of the foot measuring instrument, the first and second directions of the foot measuring instrument being perpendicular to each other.

14. The bicycle cleat positioning kit according to claim 1, wherein
the foot reference indicator includes a shoe reference outline, the cleat attachment indicator being located adjacent the shoe reference outline to indicate a cleat attachment location relative to the shoe reference outline.

15. The bicycle cleat positioning kit according to claim 1, wherein
the cleat attachment indicator includes at least one reference slit indicative of a reference point for adjusting a cleat with respect to a bicycle shoe and at least one reference aperture indicative of a position of a cleat attachment hole for attaching the cleat to the bicycle shoe.

16. A bicycle cleat positioning kit comprising:
a foot locating instrument including a foot support surface; and
a foot measuring instrument including a foot reference indicator indicative of a foot reference location and a cleat attachment indicator indicative of a cleat attachment location that is a reference location for setting a bicycle cleat relative to the foot reference indicator, the foot locating instrument and the foot measuring instrument being configured to provide parameter values to determine cleat setting locations on a bicycle shoe sole.

17. The bicycle cleat positioning kit according to claim 16, wherein
the foot support surface has a crank arm reference indicator.

18. The bicycle cleat positioning kit according to claim 17, wherein
the foot measuring instrument further includes an angular displacement indicator arranged to measure an angular displacement of a center axis of a person's foot on the foot support surface of the foot locating instrument with respect to the crank arm reference indicator of the foot locating instrument.

19. The bicycle cleat positioning kit according to claim 16, wherein
the foot measuring instrument further includes a shoe reference indicator indicative of a bicycle shoe orientation with respect to the foot reference indicator.

20. The bicycle cleat positioning kit according to claim 19, wherein
the foot measuring instrument further includes an angular displacement indicator arranged to measure an angular displacement of a center axis of a person's foot on the foot support surface of the foot locating instrument with respect to the shoe reference indicator of the foot measuring instrument.

21. The bicycle cleat positioning kit according to claim 16, wherein
the foot measuring instrument further includes a positional displacement indicator arranged to measure a positional displacement of a center point of a person's foot on the foot support surface of the foot locating instrument with respect to a center point of the cleat attachment indicator of the foot measuring instrument.

22. The bicycle cleat positioning kit according to claim 21, wherein
the positional displacement indicator of the foot measuring instrument includes a first measuring scale arranged to measure a first displacement between the center point of the person's foot on the foot support surface of the foot locating instrument and the center point of the cleat attachment indicator of the foot measuring instrument in a first direction of the foot measuring instrument.

23. The bicycle cleat positioning kit according to claim 22, wherein
the positional displacement indicator of the foot measuring instrument further includes a second measuring scale arranged to measure a second displacement between the center point of the person's foot on the foot support surface of the foot locating instrument and the center point of the cleat attachment indicator of the foot measuring instrument in a second direction of the foot measuring instrument, the first and second directions of the foot measuring instrument being perpendicular to each other.

24. The bicycle cleat positioning kit according to claim 16, wherein
the foot measuring instrument further includes a transparent sheet member on which the foot reference indicator and the cleat attachment indicator are disposed.

25. A bicycle cleat positioning kit comprising:
a foot locating instrument including a foot support surface having a crank arm reference indicator; and
a foot measuring instrument including a foot reference indicator indicative of a foot reference location, a cleat attachment indicator indicative of a cleat attachment location relative to the foot reference indicator, and an angular displacement indicator arranged to measure an angular displacement of a center axis of a person's foot on the foot support surface with respect to the crank arm reference indicator.

26. The bicycle cleat positioning kit according to claim 25, wherein
the foot measuring instrument further includes a shoe reference indicator indicative of a bicycle shoe orientation with respect to the foot reference indicator.

27. The bicycle cleat positioning kit according to claim 26, wherein
the angular displacement indicator is further arranged to measure an angular displacement of a center axis of a person's foot on the foot support surface of the foot locating instrument with respect to the shoe reference indicator of the shoe measuring instrument.

28. The bicycle cleat positioning kit according to claim 25, wherein
the foot measuring instrument further includes a positional displacement indicator arranged to measure a positional displacement of a center point of a person's foot on the foot support surface of the foot locating instrument with respect to a center point of the cleat attachment indicator of the foot measuring instrument.

29. The bicycle cleat positioning kit according to claim 28, wherein
the positional displacement indicator of the foot measuring instrument includes a first measuring scale arranged to measure a first displacement between the center point of the person's foot on the foot support surface of the foot locating instrument and the center point of the cleat attachment indicator of the foot measuring instrument in a first direction of the foot measuring instrument.

30. The bicycle cleat positioning kit according to claim 29, wherein
the positional displacement indicator of the foot measuring instrument further includes a second measuring scale arranged to measure a second displacement between the center point of the person's foot on the foot support surface of the foot locating instrument at the center point of the cleat attachment indicator of the foot measuring instrument in a second direction of the foot measuring instrument, the first and second directions of the foot measuring instrument being perpendicular to each other.

31. The bicycle cleat positioning kit according to claim 25, wherein
the foot measuring instrument further includes a transparent sheet member on which the foot reference indicator and the cleat attachment indicator are disposed.

\* \* \* \* \*